(12) United States Patent
Potnis et al.

(10) Patent No.: US 12,704,721 B2
(45) Date of Patent: Aug. 11, 2026

(54) OPTICAL COMBINERS WITH IMPROVED EFFICIENCY AND UNIFORMITY

(71) Applicant: GOOGLE LLC, Mountain View, CA (US)

(72) Inventors: Shreyas Potnis, Kitchener, CA (US); Timothy Paul Bodiya, Toronto (CA)

(73) Assignee: GOOGLE LLC, Mountain View, CA (US)

( * ) Notice: Subject to any disclaimer, the term of this patent is extended or adjusted under 35 U.S.C. 154(b) by 652 days.

(21) Appl. No.: 17/769,019

(22) PCT Filed: Nov. 4, 2020

(86) PCT No.: PCT/US2020/058907
§ 371 (c)(1),
(2) Date: Apr. 14, 2022

(87) PCT Pub. No.: WO2021/092028
PCT Pub. Date: May 14, 2021

(65) Prior Publication Data

US 2024/0103270 A1 Mar. 28, 2024

Related U.S. Application Data

(60) Provisional application No. 62/931,363, filed on Nov. 6, 2019.

(51) Int. Cl.
*G02B 27/01* (2006.01)
*G02B 27/42* (2006.01)

(52) U.S. Cl.
CPC ..... *G02B 27/0172* (2013.01); *G02B 27/4272* (2013.01); *G02B 2027/0178* (2013.01)

(58) Field of Classification Search
CPC .... G02B 2027/0105–0198; G02B 27/01–0189
See application file for complete search history.

(56) References Cited

U.S. PATENT DOCUMENTS

2017/0102543 A1* 4/2017 Vallius .................. G06T 19/006
2018/0113313 A1* 4/2018 Tekolste ................. G02B 27/42
(Continued)

FOREIGN PATENT DOCUMENTS

CN 1650215 A 8/2005
CN 103890637 A 6/2014
(Continued)

OTHER PUBLICATIONS

International Search Report and Written Opinion mailed Feb. 11, 2021 for corresponding International Application No. PCT/US2020/058907, 14 pages.
(Continued)

*Primary Examiner* — Christopher A Lamb, II

(57) ABSTRACT

Systems, devices, and methods for directing display light employ one or more optical combiners that include recycle optics such as diffraction gratings, which can receive wasted display light travelling in a volume of an optical combiner, and redirect the wasted display light towards other optics so the wasted display light may be effectively used to produce a display. The optical combiners may also include a uniformization optic which can redistribute non-uniform display light, to produce a more uniform display, which in turn enables higher efficiency optics to be used.

24 Claims, 14 Drawing Sheets

(56) References Cited

U.S. PATENT DOCUMENTS

| | | | | |
|---|---|---|---|---|
| 2018/0157042 | A1 | 6/2018 | Wall et al. | |
| 2018/0203230 | A1* | 7/2018 | Vallius | G02B 27/0172 |
| 2018/0373046 | A1* | 12/2018 | Alexander | G02B 27/0172 |
| 2019/0018245 | A1 | 1/2019 | Cheng et al. | |
| 2019/0056593 | A1 | 2/2019 | Bablumyan | |
| 2019/0179149 | A1 | 6/2019 | Curtis et al. | |
| 2019/0302358 | A1 | 10/2019 | Lin et al. | |
| 2021/0215942 | A1* | 7/2021 | Olkkonen | G02B 6/0028 |

FOREIGN PATENT DOCUMENTS

| | | | |
|---|---|---|---|
| CN | 107735716 | A | 2/2018 |
| CN | 108107576 | A | 6/2018 |
| CN | 108738358 | A | 11/2018 |
| CN | 208188393 | U | 12/2018 |
| CN | 109891282 | A | 6/2019 |
| JP | 2003315733 | A | 11/2003 |

OTHER PUBLICATIONS

International Preliminary Report on Patentability mailed May 19, 2022 for International Application No. PCT/US2020/058907, 9 pages.

European Office Action mailed Jul. 9, 2024 for EP Application No. 20808610.8, 3 pages.

Translation of Chinese Office Action mailed May 22, 2024 for CN Application No. 202080068966.2, 25 pages.

Xue, Xiao et al., "Planar waveguide based augmented reality smart glasses with large field of view", China Academic Journal Electronic Publishing House, Oct. 2019, DOI: 10.12086/oee.2019.180550 6 pages.

Translation of Chinese Notification for Patent Registration Formalities mailed Mar. 7, 2025 for CN Application No. 202080068966.2, 4 pages.

Communication Under Rule 71(3) EPC mailed Apr. 8, 2025 for EP Application No. 20808610.8, 79 pages.

* cited by examiner 231a
211
210
219
290
291
231b
231
230
293
229
221
220
200

900
801
810
811
820
830
950
954
953
947
946
945
952
951
944
943
942
941
829
940
931
932
933
934
935

950
1040
810
820
940
830
840
1100

OPTICAL COMBINERS WITH IMPROVED EFFICIENCY AND UNIFORMITY

CROSS-REFERENCE TO RELATED APPLICATIONS

The present application is a U.S. National Stage under 35 U.S.C. § 371 of International Patent Application Serial No. PCT/US2020/058907, entitled "OPTICAL COMBINERS WITH IMPROVED EFFICIENCY AND UNIFORMITY" and filed on 4 Nov. 2020, which claims priority to U.S. Provisional Application No. 62/931,363, entitled "OPTICAL COMBINERS WITH IMPROVED EFFICIENCY AND UNIFORMITY" and filed on 6 Nov. 2019, the entireties of which are incorporated by reference herein.

BACKGROUND

Electronic devices are commonplace throughout most of the world today. Advancements in integrated circuit technology have enabled the development of electronic devices that are sufficiently small and lightweight to be carried by the user. Such "portable" electronic devices may include on-board power supplies (such as batteries or other power storage systems) and may be "wireless" (i.e., designed to operate without any wire-connections to other, non-portable electronic systems); however, a small and lightweight electronic device may still be considered portable even if it includes a wire-connection to a non-portable electronic system. For example, a microphone may be considered a portable electronic device whether it is operated wirelessly or through a wire-connection.

The convenience afforded by the portability of electronic devices has fostered a huge industry. Smartphones, audio players, laptop computers, tablet computers, and ebook readers are all examples of portable electronic devices. However, the convenience of being able to carry a portable electronic device has also introduced the inconvenience of having one's hand(s) encumbered by the device itself. This problem is addressed by making an electronic device not only portable, but wearable.

A wearable electronic device is any portable electronic device that a user can carry without physically grasping, clutching, or otherwise holding onto the device with their hands. For example, a wearable electronic device may be attached or coupled to the user by a strap or straps, a band or bands, a clip or clips, an adhesive, a pin and clasp, an article of clothing, tension or elastic support, an interference fit, an ergonomic form, etc. Examples of wearable electronic devices include digital wristwatches, electronic armbands, electronic rings, electronic ankle-bracelets or "anklets," head-mounted electronic display units, hearing aids, and so on.

Because they are worn on the body of the user, and typically visible to others, and generally present for long periods of time, form factor (i.e., size, geometry, and appearance) is a major design consideration in wearable electronic devices.

A head-mounted display is an electronic device that is worn on a user's head and, when so worn, secures at least one electronic display within a viewable field of at least one of the user's eyes. A wearable heads-up display is a head-mounted display that enables the user to see displayed content but also does not prevent the user from being able to see their external environment. The "display" component of a wearable heads-up display is either transparent or at a periphery of the user's field of view so that it does not completely block the user from being able to see their external environment.

In near-eye optical devices such as rifle scopes and wearable heads-up displays, the range of eye positions (relative to the device itself) over which specific content/imagery provided by the device is visible to the user is generally referred to as the "eyebox." An application in which content is only visible from a single or small range of eye positions has a "small eyebox" and an application in which content is visible from a wide range of eye positions has a "large eyebox." The eyebox may be thought of as a volume in space positioned near the optical device. When the eye of the user (and more particularly, the pupil of the eye of the user) is positioned inside this volume and facing the device, the user is able to see all of the content provided by the device. When the eye of the user is positioned outside of this volume, the user is not able to see at least some of the content provided by the device.

The eyebox is an important property that can greatly affect the user experience for a wearable heads-up display. For example, if the wearable heads-up display has a small eyebox that centers on the user's pupil when the user is gazing directly ahead, some or all content displayed by the wearable heads-up display may disappear for the user when the user gazes even slightly off-center, such as slightly to the left, slightly to the right, slightly up, or slightly down. Unless a wearable heads-up display is deliberately designed to provide a glanceable display (i.e., a display that is not always visible but rather is only visible when the user gazes in a certain direction), it is generally advantageous for a wearable heads-up display to have a large eyebox.

In some implementations of wearable heads-up displays, a light engine is positioned at least partially outside of a user's field of view, and at least one display optic is used to redirect light from the light engine to a user's eye to form a display visible to the user. One example is a waveguide combiner, where display light from a light engine is incoupled by an incoupler optic into a volume of the waveguide combiner. The display light then travels in the volume of the waveguide combiner to be in a field of view of a user, and is subsequently outcoupled from the volume of the waveguide combiner by an outcoupler optic towards an eye of a user, thereby forming a display.

Such redirection optics can be inefficient, in that a significant portion of the display light output by the light engine may not be efficiently incoupled, outcoupled, or otherwise directed to form a visible display. As a result, the light engine will consume extra power to produce light that is not efficiently utilized, which can reduce battery life and/or require a larger battery. Further, such a system may also require that a light engine be capable of outputting extra bright light, which can require a larger light engine and/or a light engine which is subjected to more stringent safety concerns and regulations. In view of this, it is desirable to increase the efficiency of redirection optics in wearable heads-up displays to reduce the required amount of display light.

Redirection optics such as those described above may produce non-uniform displays. There can be a trade-off between optic efficiency and display uniformity, where the most uniform displays are often produced by optics with relatively low efficiency. Consequently, there can also be a trade-off between display power efficiency and display uniformity. Thus, it is desirable to provide displays which can achieve high uniformity with minimal impact on efficiency.

SUMMARY OF EMBODIMENTS

According to a broad aspect, the present disclosure describes an optical combiner comprising: an incoupler optic to receive display light from outside of the optical combiner and redirect the display light to travel in a volume of the optical combiner; an outcoupler region to receive display light travelling in the volume of the optical combiner, the outcoupler region including an outcoupler optic to redirect a first portion of the display light traveling in the volume of the optical combiner to exit the volume of the optical combiner, the outcoupler optic to allow a second portion of the display light traveling in the volume of the optical combiner to pass through the outcoupler region without being redirected to exit the volume of the optical combiner; and a first recycle optic to receive the second portion of the display light, and redirect the second portion of the display light to travel in the volume of the optical combiner back towards the outcoupler region.

The optical combiner may further comprise an expander region to receive display light from the incoupler optic, the expander region including an expander optic to redirect display light received from the incoupler optic towards the outcoupler region. The incoupler optic may redirect a third portion of display light towards the expander region, and may redirect a fourth portion of display light away from the expander region, and the optical combiner may further comprise a second recycle optic to receive the fourth portion of display light, and to redirect the fourth portion of display light towards the expander region.

The expander optic may redirect a third portion of display light towards the outcoupler region and may allow a fourth portion of display light to pass through the expander region without being redirected towards the outcoupler region. The optical combiner may further comprise: a second recycle optic to receive the fourth portion of display light which passes through the expander region without being redirected towards the outcoupler region, and to redirect the fourth portion of display light towards the expander region, wherein the expander optic may redirect the fourth portion of display light from the second recycle optic away from the outcoupler region; a third recycle optic to receive the fourth portion of display light redirected away from the outcoupler region by the expander optic, and to redirect the forth portion of display light towards the outcoupler region.

The incoupler optic, the outcoupler optic, and the first recycle optic may be surface relief gratings. The incoupler optic, the outcoupler optic, and the first recycle optic may be holograms. The outcoupler optic may be an optical grating, the first recycle optic may be an optical grating, and the first recycle optic may have a period which is half of a period of the outcoupler optic.

The outcoupler optic may be a two-dimensional optical grating to receive display light travelling in a first direction in the volume of the optical combiner, redirect some of the display light travelling in the first direction in the volume of the optical combiner to travel through the volume of the optical combiner in a second direction non-parallel to the first direction, and redirect some of the display light travelling in the second direction through the volume of the optical combiner to exit the volume of the optical combiner. Some of the display light travelling in the first direction in the volume of the optical combiner may pass through the outcoupler region without being redirected to travel in the second direction, some of the display light travelling in the second direction may pass through the outcoupler region without being redirected to exit the volume of the optical combiner, and the optical combiner may further comprise a second recycle grating to receive the display light travelling in the second direction which passes through the outcoupler region and redirect the received display light towards the outcoupler region.

The outcoupler optic and the first recycle optic may be immediately adjacent each other. The outcoupler optic and the first recycle optic may be spatially separated from each other by a gap.

According to another broad aspect, the present disclosure describes an optical combiner comprising: an incoupler optic to receive display light from outside of the optical combiner and redirect the display light to travel in a volume of the optical combiner; an outcoupler optic to receive display light travelling in the volume of the optical combiner and redirect the display light traveling in the volume of the optical combiner to exit the volume of the optical combiner; and a recycle optic to receive display light travelling in the volume of the optical combiner in a direction away from the outcoupler optic, and redirect the display light travelling in the volume of the optical combiner in a direction away from the outcoupler optic towards the outcoupler optic.

The outcoupler optic may be positioned laterally between the incoupler optic and the recycle optic.

The incoupler optic may be positioned laterally between the recycle optic and the outcoupler optic.

The optical combiner may further comprise an expander optic to receive display light from the incoupler optic, the expander optic to redirect the received display light towards the outcoupler region.

The expander optic may be positioned laterally between the recycle optic and the outcoupler optic.

According to another broad aspect, the present disclosure describes an optical combiner comprising: an incoupler optic to receive display light from outside of the optical combiner and redirect the display light to travel in a first direction in a volume of the optical combiner; an expander optic to receive display light travelling in the first direction in the volume of the optical combiner and redirect the display light to travel in a second direction in the volume of the optical combiner as a plurality of spatially separated portions of display light, the second direction non-parallel to the first direction; a uniformization optic to receive at least one of the spatially separated portions of display light travelling in the second direction in the volume of the optical combiner, and for each spatially separated portion of display light travelling in the second direction in the volume of the optical combiner received by the uniformization optic, to redirect a sub-portion of the spatially separated portion of display light travelling in the second direction in the volume of the optical combiner to travel in the first direction in the volume of the optical combiner and subsequently redirect the sub-portion to travel in the second direction in the volume of the optical combiner; and an outcoupler optic to receive display light travelling in the second direction in the volume of the optical combiner and redirect the display light to exit the volume of the optical combiner.

Each of the incoupler optic, the expander optic, the uniformization optic, and the outcoupler optic may comprise surface relief gratings. Each of the incoupler optic, the expander optic, the uniformization optic, and the outcoupler optic may comprise holograms.

The uniformization optic may comprise an optical grating, and for a region of the uniformization optic near to the incoupler optic, the uniformization optic may have a first diffraction efficiency, for a region of the uniformization optic distal to the incoupler optic, the uniformization optic may have a second diffraction efficiency, the first diffraction efficiency greater than the second diffraction efficiency.

For a region of the uniformization optic near to the incoupler grating, the uniformization optic may have a first width in the second direction, for a region of the uniformization optic distal to the incoupler optic, the uniformization optic may have a second width in the second direction, the first width greater than the second width.

The expander optic and the uniformization optic may be immediately adjacent each other. The expander optic and the uniformization optic may be a continuous grating area. The expander optic and the uniformization optic may be spatially separated by a gap.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with portable electronic devices and head-worn devices, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the embodiments.

The various embodiments described herein provide optical combiners with improved efficiency and/or display uniformity.

Figure 1:
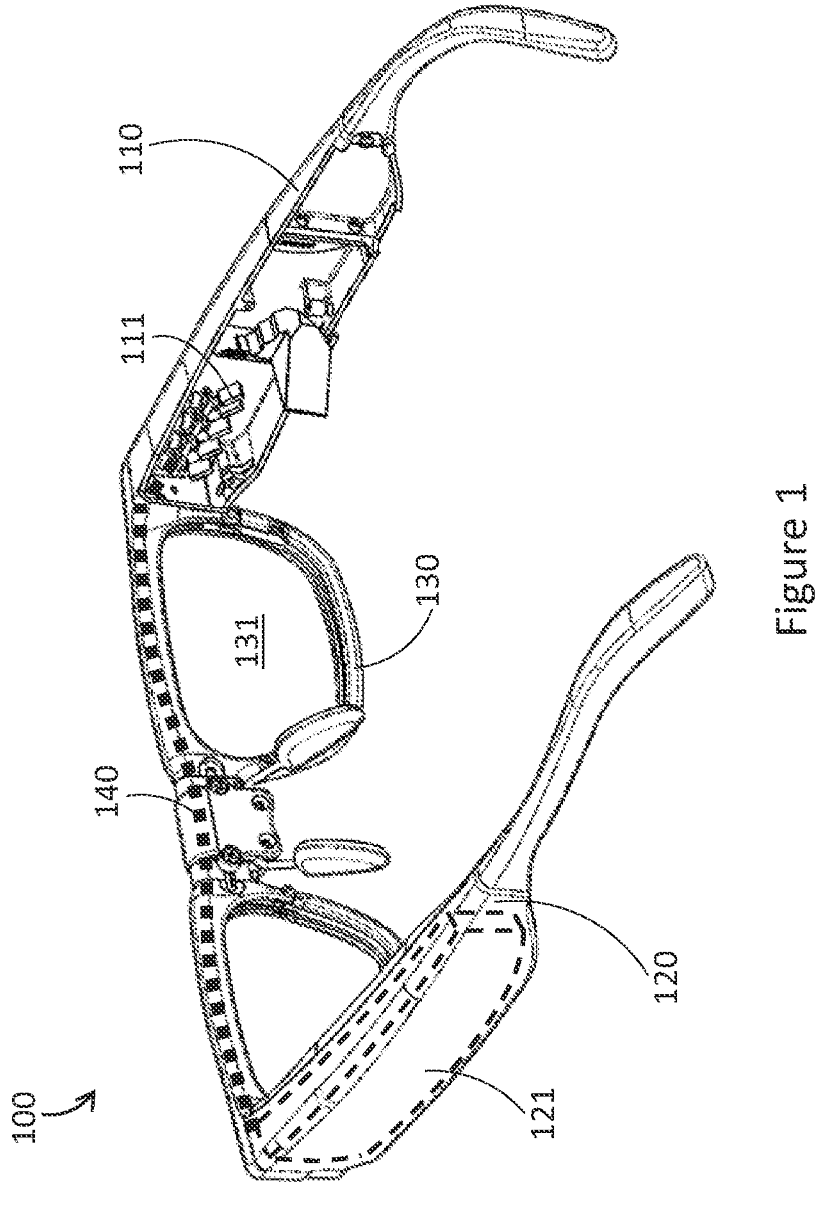
FIG. 1 is a partial-cutaway perspective diagram of an exemplary wearable heads-up display ("WHUD") in accordance with the present systems, devices, and methods.

FIG. 1 is a partial-cutaway perspective diagram of an exemplary wearable heads-up display ("WHUD") 100 in accordance with the present systems, devices, and methods. WHUD 100 includes a first arm 110, a second arm 120, and a front frame 130 which is physically coupled to first arm 110 and second arm 120. When worn by a user, first arm 110 is to be positioned on a first side of a head of the user, second arm 120 is to be positioned on a second side of a head of a user opposite the first side of the head of the user, and front frame 130 is to be positioned on a front side of the head of a user. First arm 110 carries a light engine assembly 111 which outputs light representative of display content to be viewed by a user. First arm 110 may also optionally carry several additional components of WHUD 100, such as at least one processor, at least one non-transitory processor-readable storage medium, or a power supply circuit, for example. Front frame 130 carries an optical combiner 131 in a field of view of the user which receives light output from the light engine assembly 111 and redirects this light to form a display to be viewed by the user. In the case of FIG. 1, the display will be a monocular display visible to a right eye of a user. Second arm 120 as shown in FIG. 1 carries a power source 121 which powers the components of WHUD 100. Front frame 130 also carries at least one set of electrically conductive current paths 140 which provide electrical coupling between power source 121 and light engine 111, and any other electrical components carried by first arm 110. "Power source" as used herein can refer to a component which provides electrical power. This could include for example a source of stored power such as a battery, including a chemical battery or a mechanical battery, or could include power generation systems such as piezoelectric elements, solar cells, or similar. A "set of electrically conductive current paths" as used herein can refer to a single electrically conductive current path, such as a wire or conductive trace on a printed circuit board, as well as a plurality of electrically conductive current paths, such as a plurality of wires or a plurality of conductive traces on a printed circuit board. Further, for a set of electrically conductive current paths to provide electrical coupling, at least one current path in the set can provide the coupling. It is possible, but not necessary, that a plurality or all of the electrically conductive current paths in the set provide the coupling. Further, for one set of electrically conductive current paths to provide electrical coupling to another set of electrically conductive current paths, at least one current path in the one set should couple to at least one current path in the other set. It is possible, but not necessary, for each electrically conductive current path in the one set to couple to a respective electrically conductive current path in the other set. It is also possible that either of the sets of electrically conductive current paths could act as fan-in or fan-out paths, in which the number of conductors in one set of electrically conductive current paths is greater or less than the number of conductors in the other set of electrically conductive current paths.

Figure 3:
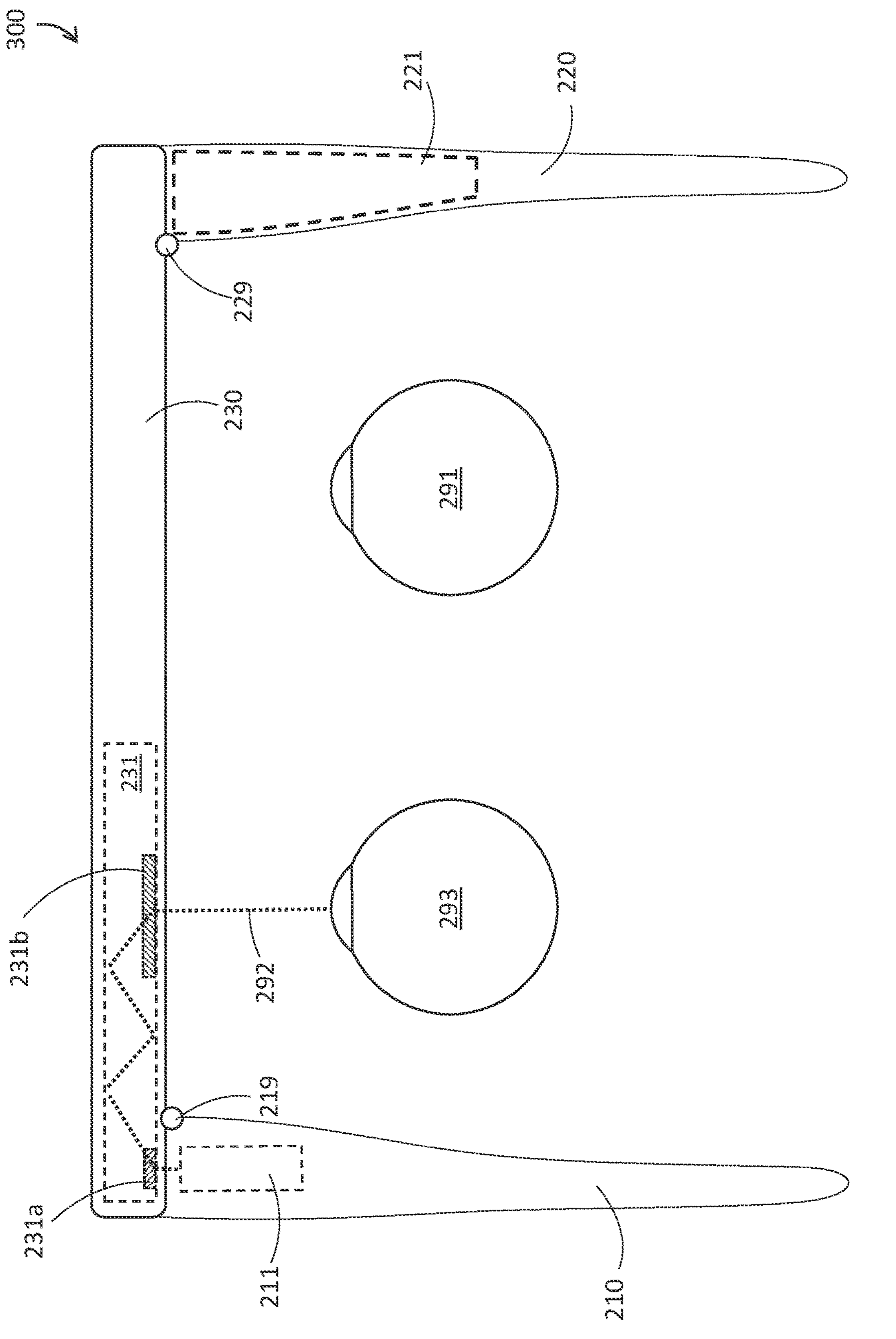
FIG. 3 is a top cutaway view of another exemplary WHUD in accordance with the present systems, devices, and methods.
Figure 4:
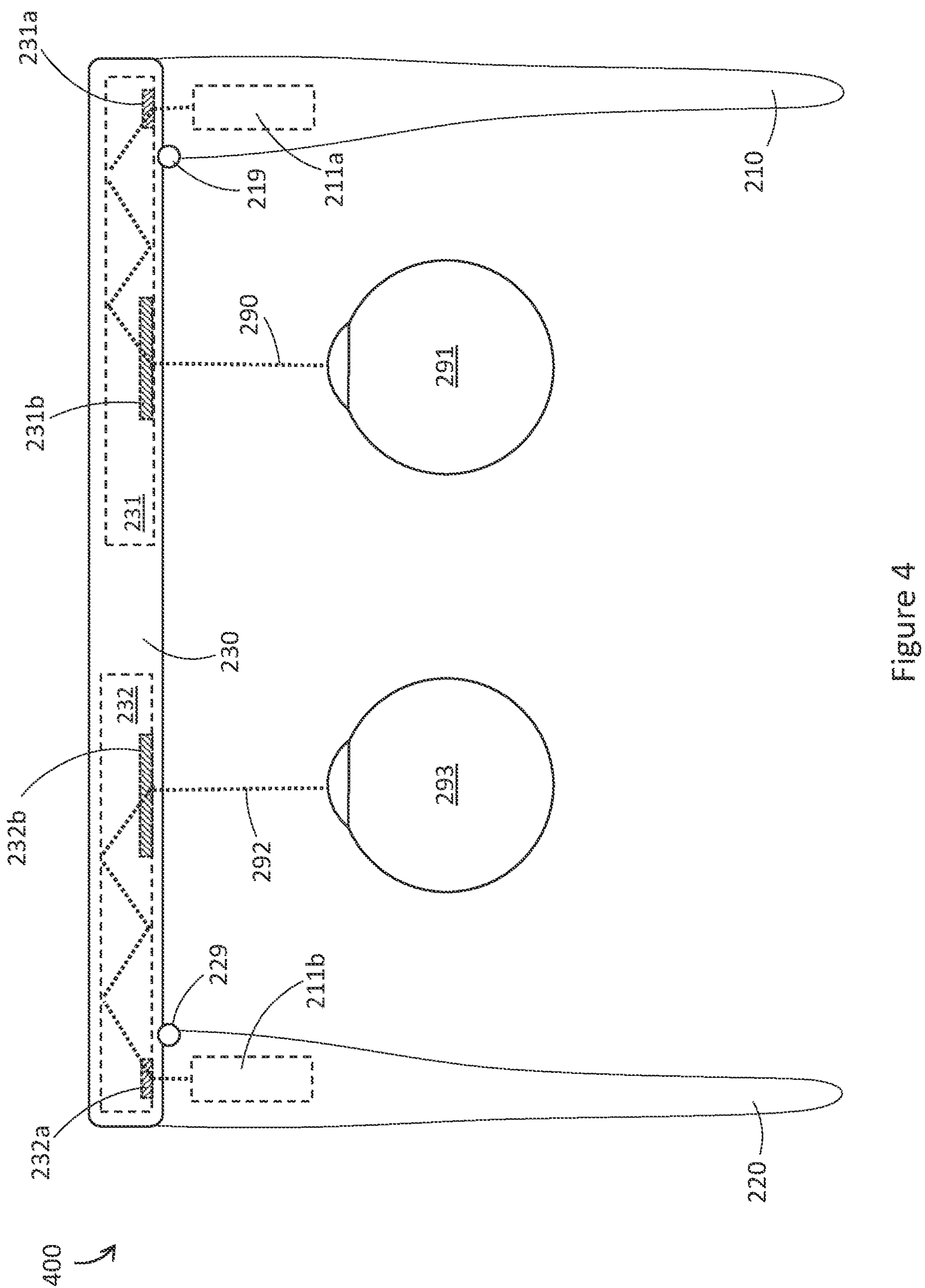
FIG. 4 is a top cutaway view of yet another exemplary WHUD in accordance with the present systems, devices, and methods.

As an example, the orientation of WHUD 100 could be reversed, such that the display is presented to a left eye of a user instead of the right eye, as illustrated in FIG. 3 described later. As another example, second arm 120 could carry a light engine assembly similar to light engine assembly 111 carried by first arm 110, and front frame 130 could also carry an optical combiner similar to optical combiner 131, such that WHUD 100 presents a binocular display to both a right eye and a left eye of a user, as illustrated in FIG. 4 described later.

Light engine assembly 111 and optical combiner 131 can include any appropriate display architecture for outputting light and redirecting the light to form a display to be viewed by a user. For example, light engine 111, and any of the light engines discussed herein, could include at least one component selected from a group comprising at least: one of a projector, a scanning laser projector, a microdisplay, a white-light source, or any other display technology as appropriate for a given application. Optical combiner 131, and any of the optical combiners discussed herein, could include at least one optical component selected from a group comprising at least: a waveguide, at least one holographic optical element, at least one prism, a diffraction grating, at least one light reflector, a light reflector array, at least one light refractor, a light refractor array, or any other light-redirection technology as appropriate for a given application, positioned and oriented to redirect the display light towards the eye of the user. Optical combiner 131 can be carried by a lens, and the lens can be carried by front frame 130. For example, optical combiner 131 could be: a layer formed as part of a lens, a layer adhered to a lens, a layer embedded within a lens, a layer sandwiched between at least two lenses, or any other appropriate arrangement. A layer can for example be molded or cast, and/or could include a thin film and/or coating. Alternatively, optical combiner 131 could be a lens carried by front frame 130. Further, a "lens" as used herein can refer to a plano lens which applies no optical power and does not correct a user's vision, or a "lens" can be a prescription lens which applies an optical power to incoming light to correct a user's vision.

Exemplary display architectures could include for example scanning laser projector and holographic optical element combinations, side-illuminated optical waveguide displays, pin-light displays, or any other wearable heads-up display technology as appropriate for a given application.

The term "light engine" as used herein is not limited to referring to a singular light source but can also refer to a plurality of light sources, and can also refer to a "light engine assembly". A light engine assembly may include some components which enable the light engine to function, or which improve operation of the light engine. As one example, a light engine assembly could include at least one light source, such as a laser or a plurality of lasers. The light engine assembly may additionally include electrical components such as driver circuitry to power the at least one light source. The light engine assembly may additionally include optical components such as collimation lenses, a beam combiner, or beam shaping optics. The light engine assembly may additionally include beam redirection optics such as least one MEMS mirror, which can be operated to scan light from at least one laser light source such as in a scanning laser projector. In the above example, the light engine assembly includes not only a light source, but also components which take the output from at least one light source and produce conditioned display light. All of the components in the light engine assembly can be included in a housing of the light engine assembly, could be affixed to a substrate of the light engine assembly such as a printed circuit board or similar, or could be separately mounted components of a WHUD.

The term "optical combiner" as used herein can also refer to an "optical combiner assembly". An optical combiner assembly may include additional components which support or enable functionality of the optical combiner. As one example, a waveguide combiner may be very thin, and consequently very fragile. To this end, it may be desirable to position the waveguide combiner within or on a transparent carrier, such as a lens. An optical combiner assembly could be a package which includes the transparent carrier and the waveguide positioned therein or thereon. As another example, an optical combiner assembly could include a prescription component, which applies an optical power to incoming light to compensate for imperfect user eyesight. Such a prescription component could include curvature applied to a transparent carrier itself or could include a component additional to the transparent carrier, such as a clip-in or add-on lens.

Several exemplary WHUDs are described below, which further illustrate various features of the present systems, devices, and methods. One skilled in the art will appreciate that the specific features described in the below implementations can be combined as appropriate, such that the present disclosure is not restricted to only the implementations discussed below, but also includes any reasonable combination of the features of the implementations discussed herein.

Figure 2:
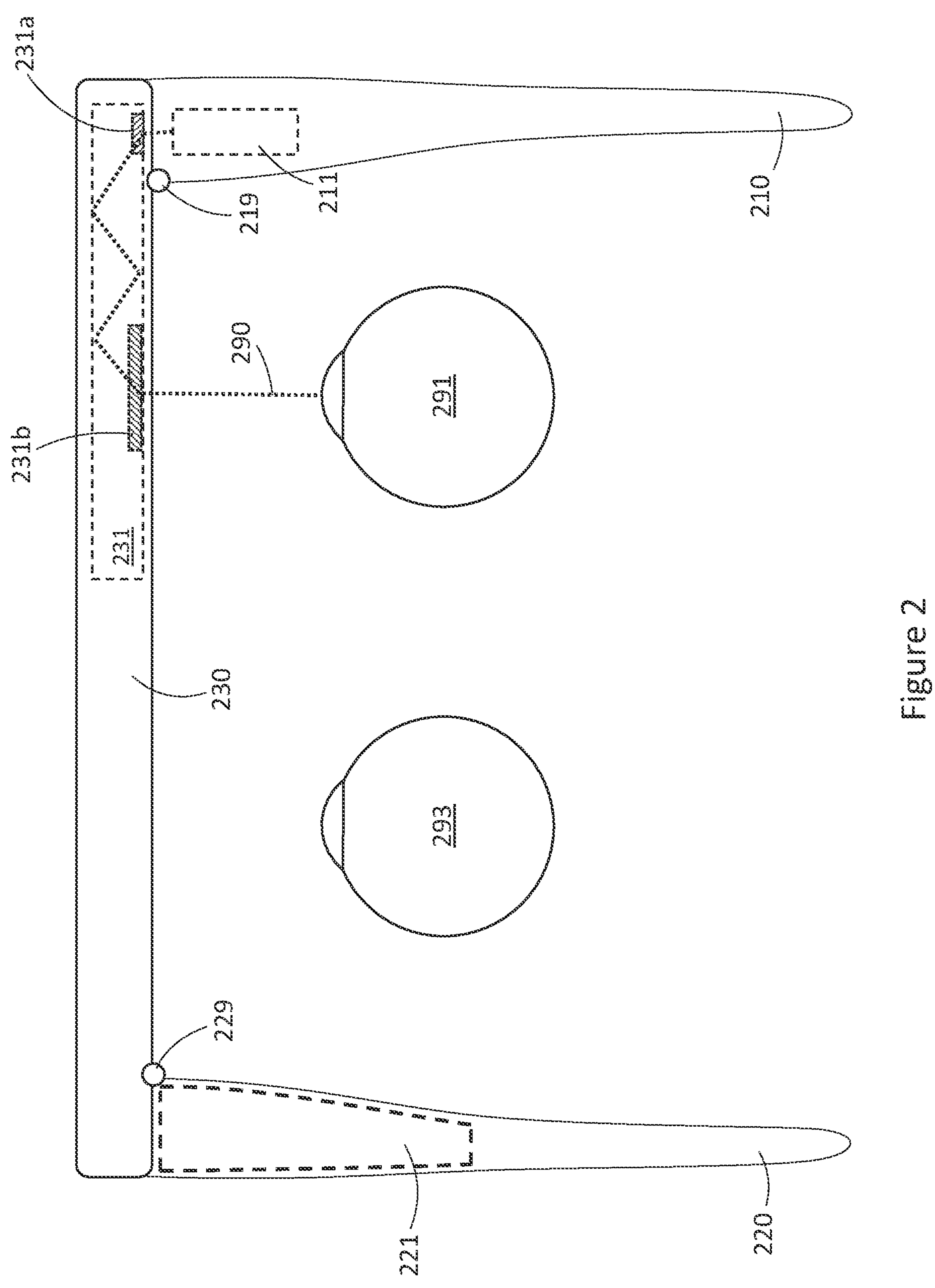
FIG. 2 is a top cutaway view of an exemplary WHUD in accordance with the present systems, devices, and methods.

FIG. 2 is a top cutaway view of an exemplary WHUD 200 in accordance with the present systems, devices, and methods. Similar to WHUD 100, WHUD 200 includes a first arm 210, a second arm 220, and a front frame 230. First arm 210 is coupled to front frame 230 by hinge 219, which allows first arm 210 to rotate relative to front frame 230. Second arm 220 is coupled to front frame 230 by hinge 229, which allows second arm 220 to rotate relative to front frame 230. FIG. 2 illustrates WHUD 200 in an unfolded configuration, in which first arm 210 and second arm 220 are rotated such that WHUD 200 can be worn on a head of a user, with first arm 210 positioned on a first side of the head of the user, second arm 220 positioned on a second side of the head of the user opposite the first side, and front frame 230 positioned on a front of the head of the user. First arm 210 and second arm 220 can be rotated towards front frame 230, until both first arm 210 and second arm 220 are approximately parallel to front frame 230, such that WHUD 200 will be in a compact shape which fits conveniently in a slim rectangular, cylindrical, or oblong case.

In FIG. 2, first arm 210 carries light engine assembly 211. Second arm 220 carries power source 221. Front frame 230 carries optical combiner 231 and at least one set of electrically conductive current paths (not illustrated to avoid clutter). The terms "carry", "carries" or similar used herein do not necessarily dictate that one component physically supports another component. For example, it is stated above that first arm 210 carries light engine assembly 211. This could mean that light engine assembly 211 is mounted to or within first arm 210 such that first arm 210 physically supports light engine assembly 211. However, it could also describe a direct or indirect coupling relationship, even when first arm 210 is not necessarily physically supporting light engine assembly 211. As an example, in some implementations, a hinge of a WHUD can support both an arm of the WHUD and a light engine of the WHUD, with no direct supporting relationship between the light engine and the first arm. This can be true of any of the component relationships described herein where one component "carries" another.

The at least one set of electrically conductive current paths provide electrical coupling between power source 221 and electrical components carried by first arm 210, such as light engine assembly 211. Such electrical coupling could be provided indirectly, such as through a power supply circuit, or could be provided directly from power source 221 to each electrical component in first arm 210.

In some implementations, it is possible that when WHUD 200 is not in the unfolded configuration, the electrical coupling between power source 221 and the electrical components in first arm 210 can be disconnected. For example, WHUD 200 could include a safety switch which disconnects or disables the provision of power from power supply 221. As another example, at least one of the set of electrically conductive current paths can be physically disconnected from other electrically conductive current paths, electrical components, or power source 221 when WHUD 200 is not in the unfolded configuration.

Light engine assembly 211 can output display light 290 representative of display content to be viewed by a user. Display light 290 can be redirected by an optical combiner 231 towards an eye 291 of the user, such that the user can see the display content. In the case of WHUD 200, optical combiner 231 is a waveguide combiner which includes an incoupler optic 231*a* and an outcoupler optic 231*b*. Display light 290 from light engine assembly 211 impinges on incoupler optic 231*a* and is redirected to travel in a volume of waveguide combiner 231, where the display light 290 is guided through the waveguide, such as by total internal reflection or waveguide surface treatments like holograms or reflective coatings. Subsequently, display light 290 travelling in the volume of waveguide combiner 231 impinges on outcoupler optic 231*b*, which redirects display light 290 out of the waveguide combiner and towards an eye 291 of a user.

WHUD 200, as well as any other WHUD discussed herein, can include at least one processor communicatively coupled to each of the electrical components in WHUD 200, including but not limited to light engine 211. The at least one processor can be any suitable component which can execute instructions or logic, including but not limited to a micro-controller, microprocessor, multi-core processor, integrated-circuit, ASIC, FPGA, programmable logic device, or any appropriate combination of these components. Further, WHUD 200, as well as any other WHUD discussed herein, can include at least one non-transitory processor-readable storage medium which may store processor readable instructions thereon, which when executed by at least one processor can cause the at least one processor to execute any number of functions, including causing light engine 211 to output light 290 representative of display content to be viewed by a user, receiving user input, managing user interfaces, generating display content to be presented to a user, receiving and managing data from any sensors carried by WHUD 200, receiving and processing external data and messages, and/or any other functions as appropriate for a given application. The at least one non-transitory processor-readable storage medium can be any suitable component which can store instructions, logic, or programs, including but not limited to non-volatile or volatile memory, read only memory (ROM), random access memory (RAM), FLASH memory, registers, magnetic hard disk, optical disk, or any combination of these components.

FIG. 3 is a top cutaway view of a WHUD 300. WHUD 300 can be similar in at least some respects to WHUD 200 of FIG. 2. Unless context clearly dictates otherwise, the description relating to components of WHUD 200 can be applicable to similarly numbered components of WHUD 300. Further, WHUD 300 can transition between a folded configuration and an unfolded configuration similarly to WHUD 200 illustrated in FIG. 2.

One difference between WHUD 300 and WHUD 200 is that the orientation of the components in WHUD 300 are reversed relative to WHUD 200. In particular, in WHUD 200, first arm 210 is to be positioned on a right side of the head of a user when worn and second arm 220 is to be positioned on a left side of the head of the user when worn. On the other hand, in WHUD 300, first arm 210 is to be positioned on a left side of the head of a user when worn and second arm 220 is to be positioned on a right side of the head of the user when worn. Light engine assembly 211 can output display light 292, which is redirected by optical combiner 231 towards a left eye 293 of a user as shown in FIG. 3, instead of right eye 291 as shown in FIG. 2.

The reversal of the orientation of a WHUD described with reference to WHUD 300 of FIG. 3 is fully applicable to any of the WHUDs described herein.

FIG. 4 is a top cutaway view of a WHUD 400. WHUD 400 can be similar in at least some respects to WHUD 200 of FIG. 2. Unless context clearly dictates otherwise, the description relating to components of WHUD 200 can be applicable to similarly numbered components of WHUD 400. Further, WHUD 400 can transition between a folded configuration and an unfolded configuration similarly to WHUD 200 illustrated in FIG. 2.

One difference between WHUD 400 and WHUD 200 is that WHUD 400 has binocular display capabilities. That is, WHUD 400 can present a display to both eye 291 and eye 293 of a user. This can be achieved by including a first optical combiner 231 in front of a first eye 291 of the user and positioning a second optical combiner 232 in front of a second eye 293 of the user. A first light engine assembly 211*a* carried by first arm 210 can output display light 290 to first optical combiner 231, which can redirect light 290 towards first eye 290 of a user to form a display seen by first eye 291. A second light engine assembly 211*b* carried by second arm 220 can output display light 292 to second optical combiner 232, which can redirect light 292 towards second eye 293 of a user to form a display seen by second eye 293.

Optical combiner 231 in FIG. 4 can be similar to optical combiner 231 in FIG. 2, including incoupler optic 231*a* and outcoupler optic 231*b*, such that optical combiner 231 is a waveguide combiner which redirects display light towards an eye of the user. Further, optical combiner 232 can be similar to optical combiner 231 described with reference to FIG. 3; incoupler optic 232*a* can be similar to incoupler optic 231*a* described with reference to FIG. 3; and outcoupler optic 232*b* can be similar to outcoupler optic 231*b* described with reference to FIG. 3. In this way, optical combiner 232 can be a waveguide combiner which redirects display light towards another eye of the user.

Optionally, in each of the WHUDs discussed herein, each of first arm 210 and second arm 220 could carry any of a respective processor, a respective non-transitory processor-readable medium, and a respective power supply circuit.

In implementations with multiple light engine assemblies and/or multiple optical combiners, such as WHUD 400 illustrated in FIG. 4, a WHUD could include a common processor, common non-transitory processor-readable storage medium, and common power supply circuit which are shared by each light engine assembly.

FIGS. 5-14 discussed below illustrate several possible implementations of optical combiner, any of which could be implemented in the WHUDS discussed herein. For example, any of optical combiner 231 or optical combiner 232 discussed above could correspond to any of the optical combiners discussed below with reference to FIGS. 5-14. Each of the optical combiners illustrated in FIGS. 5-14 are shaped like a lens to be inserted in a pair of eyeglasses, but any of the optical combiners could have any appropriate shape. For example, any of the optical combiners could be visor-shaped to fit in a head mounted display, such as a helmet or head piece. Further each of FIGS. 5-14 illustrates a single optical combiner, which when implemented in a pair of eyeglasses would produce a display visible to one eye of a user. However, a pair of eyeglasses, or any other WHUD, could include two of the described optical combiners to produce a binocular display, similar to as shown in FIG. 4. Alternatively, in some implementations, a single optical combiner could span in front of both eyes of a user, such as in visor-type displays.

Further, the description related to each of FIGS. 5-14 below describes different "optics", including for example "incoupler optic", "outcoupler optic", "expander optic", "recycle optic", and "uniformization optic". These optics generally serve to redirect light in a manner detailed below, and any of these optics could include an optical grating, such as a surface relief grating or a hologram. A hologram can be considered as a type of optical grating, i.e. a holographic grating. Further, throughout the discussion herein, reference is made to the "efficiency" of a given optic. This can refer to the proportion of light which is redirected to travel in a desired direction. For example, in the case of optical gratings, "efficiency" can refer to diffraction efficiency, which describes the proportion of light is redirected by the optical grating to travel in a particular order of the optical grating. In the case of surface relief gratings, efficiency can be controlled by controlling for example to fill factor or shape of ridges and grooves in a given grating. In the case of holographic gratings, efficiency controlled by controlling for example the index modulation of the holographic grating.

Further still, each of FIGS. 5-14 show light travelling in different directions. Generally, a directional arrow indicates a direction of travel of light. A circle with an "X" in it indicates a direction of travel into the page. A circle with a dot in it indicates a direction of travel out of the page. An empty circle indicates a redirection of display light within the volume of an optical combiner. Further, FIGS. 5-14 illustrate display light travelling in a volume of an optical combiner with a lateral arrow which extends across some distance on the page; however, display light travelling in the volume of the optical combiner can also travel slightly in and out of the page, as the display light bounces back and forth between surfaces of the optical combiner.

In the implementations discussed below with reference to FIG. 5-14, as display light travels through the volume of an optical combiner, the display light will bounce back and forth between opposing surfaces of the optical combiner. Each optic, including incoupler optics, outcoupler optics, recycle optics, expander optics, and/or uniformization optics, can be positioned within the optical combiner or at either of the surfaces of the optical combiner. When light traveling in the volume of optical combiner impinges on a given optic, the impinged optic will redirect at least a portion of the impinging light. This principle is illustrated in FIGS. 2, 3, and 4, with display light travelling through a volume of optical combiner 231 or optical combiner 232, impinging on outcoupler optic 231*b* or outcoupler optic 231*a*, and being redirected to exit the volume of the optical combiner 231 or optical combiner 232. FIGS. 2, 3, and 4 illustrate transmissive optics, in that display light impinges on a given optic and is redirected as the display light passes through the given optic. However, any of the implementations discussed herein could use reflective optics, where display light impinges on a given optic and is reflected in a desired direction. Further, a combination of reflective optics and transmissive optics could be implemented in a single optical combiner. Further still, any of the optics in a given optical combiner could be positioned at either boundary of the optical combiner or in the volume of the optical combiner, and any optical combiner could include any combination where different optics are positioned at different boundaries or different positions within the volume of the optical combiner.

In the discussion of FIG. 5-14 below, reference is made to "regions" which comprise certain "optics". Examples include an incoupler region comprising an incoupler optic, an outcoupler region comprising an outcoupler optic, a recycle region comprising a recycle optic, an expander region comprising an expander optic, and a uniformization region comprising a uniformization optic. The distinction between a "region" and an "optic" is that a "region" generally refers to an area or volume of an optical combiner in which the "optic" is positioned, and the "optic" refers to the physical component or features which redirect light. The orthogonal area of the optic can define the orthogonal area of the region. Display light can pass through a "region" without necessarily passing through the corresponding "optic" positioned in the region. As an example, an optic could be an optical grating at a boundary of an optical combiner. Display light can be travelling in a volume of the optical combiner, and can impinge on said optic, but a portion of the display light may not be redirected by the optic to exit the volume of the optical combiner. Said portion of display light may exit the "region", thereby passing through the region without having "passed through" the optic itself.

Figure 5:
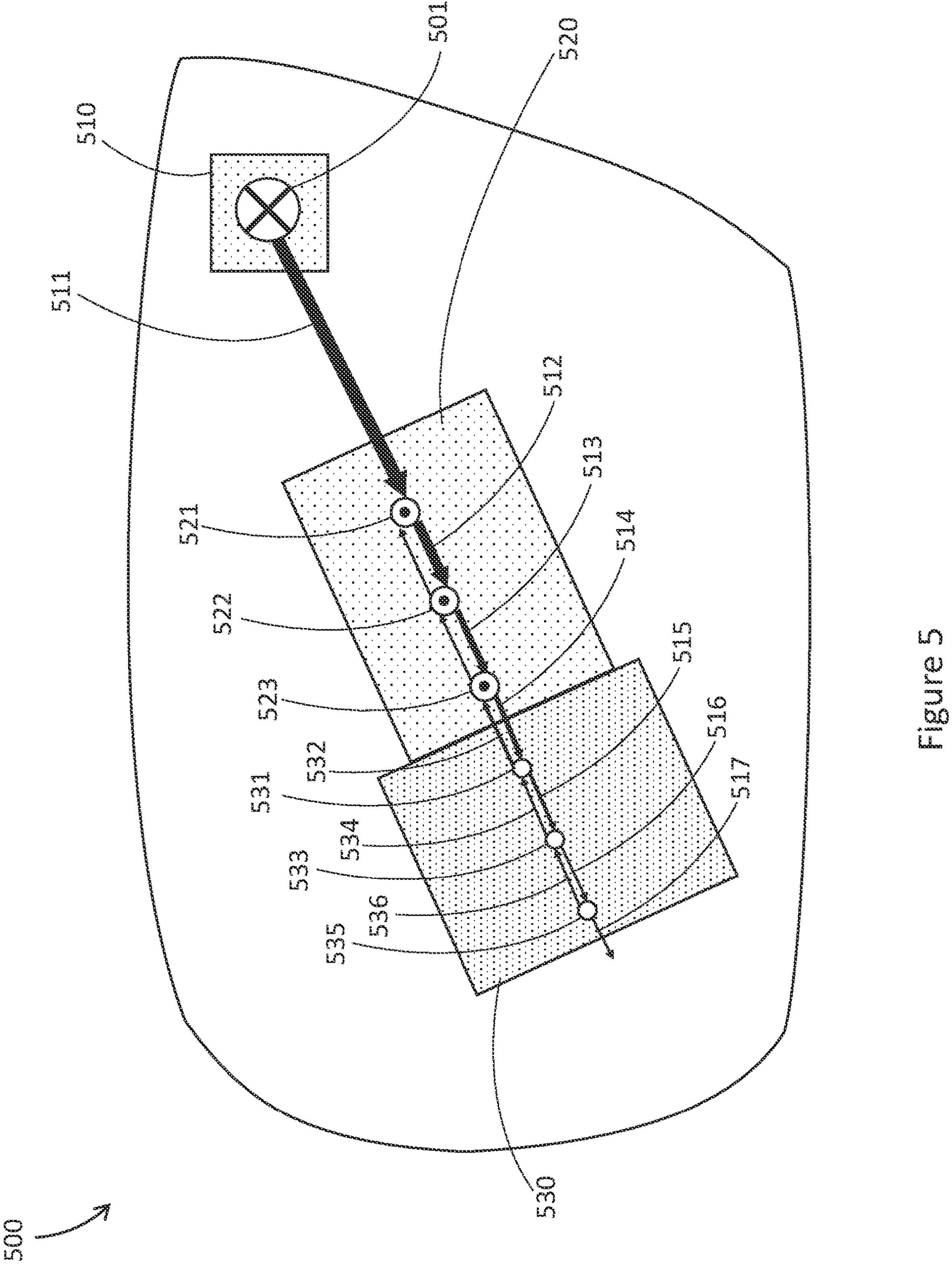
FIG. 5 is an orthogonal view of an optical combiner comprising an incoupler optic, an outcoupler optic, and a recycle optic, in accordance with one exemplary implementation.

FIG. 5 is an orthogonal view of an optical combiner 500. Optical combiner 500 includes an incoupler region comprising incoupler optic 510, an outcoupler region comprising outcoupler optic 520, and a recycle region comprising a recycle optic 530. Incoupler optic 510 receives display light 501 from outside of optical combiner 500, such as display light output by a light engine. Incoupler optic 510 redirects display light 501 to travel in a volume of optical combiner 500, illustrated as display light 511. Incoupler optic 510 can direct display light 511 to travel towards outcoupler optic 520 in the outcoupler region.

In the case of FIG. 5, display light 511 travelling in the volume of optical combiner 500 enters the outcoupler region and impinges on the outcoupler optic 520 at point 521. At least a portion of display light 511 will be redirected by the outcoupler optic 520 to exit the volume of optical combiner 520. However, outcoupler optic 520 may not be 100% efficient, which means that not all of the light which impinges on outcoupler optic 520 will be redirected to exit the volume of optical combiner 500. Instead, a portion of display light 511 will continue to travel in the volume of optical combiner 500 through the outcoupler region, illustrated as display light 512. A similar effect happens at point 522, where a portion of display light 512 is redirected by outcoupler optic 520 to exit the volume of optical combiner 500, and a portion of display light 512 is not redirected to exit the volume of optical combiner 500 but instead continues to travel in the volume of optical combiner 500 as display light 513. A similar effect happens again at point 523, where a portion of display light 513 is redirected by outcoupler optic 520 to exit the volume of optical combiner 500, and a portion of display light 513 is not redirected to exit the volume of optical combiner 500 but instead continues to travel in the volume of optical combiner 500 as display light 514.

Although FIG. 5 shows three points 521, 522, and 523 at which display light is redirected to exit the volume of optical combiner 500, in practice the optical combiner 500 could be designed so the there are fewer or more points at which display light is redirected to exit the volume of the optical combiner 500. For example, optical combiner 500 could be made thinner, which will make light bounce between surfaces of optical combiner 500 more frequently, thus increasing the amount of points at which display light impinges on outcoupler optic 520 and is redirected to exit optical combiner 500. As another example, outcoupler optic 520 could be made to cover a larger area, which will also increase the number of points at which display light will impinge on outcoupler optic 520 and be redirected to exit the volume of the optical combiner 500. It can be preferable to have many points at which display light is redirected to exit the volume of the optical combiner 500, because each point at which light is redirected to exit the volume of the optical combiner 500 will correspond to an "exit pupil", i.e. a point at which light originates to form a display visible to the user. More exit pupils over a display can result in a larger eyebox, improving visibility of the display. In general, throughout this disclosure, each point at which display light is redirected to exit the volume of an optical combiner in the field of view of a user can correspond to an exit pupil.

Further, it can be desirable for outcoupler optic 520 to have a relatively low efficiency, in order to enable redirecting a meaningful amount of light to exit the volume of optical combiner 500 at a number of points. In the example of FIG. 5, display light 511 from the outcoupler is redirected to exit the volume of the outcoupler at three sequential points 521, 522, and 523. If the efficiency of outcoupler optic were high, this would result in a very noticeable difference in brightness of the light redirected to exit the volume of the optical combiner at each of the points. For example, if outcoupler optic 520 were 95% efficient, this means 95% of display light 511 would be redirected to exit the volume of the optical combiner at point 521, and display light 512 which continues to travel in the volume of the optical combiner would comprise 5% of display light 511. At point 522, 95% of display light 512 would be redirected to exit the volume of optical combiner 500. Since display light 512 is only 5% of display light 511, this means that the amount of display light 511 exiting the volume of the optical combiner at point 522 is 95% of 5%, which is 4.75%. That is, in this example 95% of display light 511 would exit the volume of optical combiner 500 at point 521, whereas only 4.75% of display light 511 would exit the volume of the optical combiner 500 at the subsequent point 522. For the same reasons, only 0.2375% of display light 511 would exit the volume of optical combiner 520 at the third point 523. Evidently, the amount of display light which exits the volume of the optical combiner 500 at each point is very different, and thus a resulting display would not be very uniform.

To provide a more uniform display, the efficiency of outcoupler optic 520 could be designed to be relatively low. As an example, if outcoupler optic 520 were 5% efficient, 5% of display light 511 will be redirected to exit the volume of optical combiner 500 at point 521, 4.75% of display light 511 will be redirected to exit the volume of optical combiner 500 at point 522, and 4.5125% of display light 511 will be redirected to exit the volume of optical combiner 500 at point 523. Evidently, the resulting display will be much more uniform. However, due to this lower efficiency, more display light traveling in the volume of optical combiner 511 will pass through the outcoupler region without being redirected to exit the volume of the optical combiner 500, illustrated as display light 514 in FIG. 5. In the above example where the efficiency of the outcoupler optic 520 is 5%, display light 514 that passed through the outcoupler region without being redirected to exit the volume of the optical combiner would comprise 85.7375% of display light 511. That is, absent any light recycling features, 85.7375% of the display light which is directed to the outcoupler region would be wasted. This is a significant problem for several reasons. Firstly, this means a significant amount of power is wasted, which is not ideal for wearable devices where battery size, and thus available power, is very limited. Secondly, more powerful light sources are required to generate the necessary amount of light, which can require larger light sources and associated drive circuitry, which is again non-ideal in wearable devices where it is desirable to reduce size and weight. Thirdly, implementing more powerful light sources may raise concerns regarding total output power and user eye safety.

One skilled in the art will appreciate that the efficiencies and percentages discussed above and throughout this application are merely exemplary, and the efficiency of each optic could be selected as appropriate based on a given application. Further, each optic in a given optical combiner could have the same efficiency, but it is also possible for each optic in a given optical combiner to have a different efficiency.

The present invention addresses the above issues by providing at least one recycle optic to redirect otherwise wasted display light towards the outcoupler region, so that this wasted display light can still be utilized to form a visible display. In the exemplary optical combiner 500 in FIG. 5, a recycle optic 530 is provided, which receives display light 514 that passes through the outcoupler region without being redirected to exit the volume of the optical combiner 500. Generally, the outcoupler optic 520 is positioned laterally between the incoupler optic 510 and the recycle optic 530. Recycle optic 530 could for example be an optical grating. Such a recycle optic 530 could have a period which is half of a period of outcoupler optic 520. As one example, outcoupler optic 520 could be a one-dimensional optical grating, and recycle optic 530 could be another one-dimensional optical grating with double the frequency of outcoupler optic 520. In the case of surface relief gratings, this would mean a frequency of grooves or ridges of the recycle optic 530 would be double the frequency of grooves or ridges of outcoupler optic 520. In the case of holographic gratings, this could mean that a frequency of index modulation of recycle optic 530 could be double a frequency of index modulation of outcoupler optic 520. Consequently, display light 514 which impinges on recycle optic 530 can be redirected to travel in a volume of the optical combiner 500 back towards the outcoupler region.

In the example of FIG. 5, display light 514 impinges on recycle optic 530 at point 531, which redirects at least a portion of display light 514 back towards the outcoupler region as display light 532. Preferably, recycle optic 530 will have a relatively high efficiency, to redirect as much display light as possible back towards the outcoupler region. However, a perfectly efficient recycle optic may not be possible. In the example of FIG. 5, display light 515 is display light which impinges on recycle optic 530 at point 531 but is not redirected back towards the outcoupler region. Instead, display light 515 continues to travel through the volume of optical combiner 500 away from the outcoupler region. To maximize the amount of light redirected back towards the outcoupler region, the recycle optic 530 could cover a larger area, such that display light 515 will impinge on recycle optic 530 again at point 533. A portion of display light 515 will be redirected by recycle optic 530 back towards the outcoupler region as display light 534, and a portion of display light 515 will continue to travel through the volume of optical combiner 500 away from the outcoupler region, illustrated as display light 516. Similarly, display light 516 could impinge on recycle optic 530 at a point 535, and a portion of display light 516 will be redirected back towards the outcoupler region, illustrated as display light 536, and a portion of display light 516 will continue to travel through the volume of optical combiner 500 away from the outcoupler region, illustrated as display light 517. Display light 517 will still be wasted light but will be comprise less light than display light 514. Consequently, inclusion of recycle optic 530 in optical combiner 500 will reduce the amount of wasted display light.

FIG. 5 illustrates that display light impinges on recycle optic 530 at three points 531, 533, and 535. However, optical combiner 500 and recycle optic 530 could be designed such that display light will impinge on recycle optic 530 fewer or more times. For example, recycle optic 530 may be small, such that display light travelling in the volume of the optical combiner 500 only impinges on recycle optic 530 a single time. As another example, recycle optic 530 could occupy a large area, and/or optical combiner 500 could be made thin, such that display light travelling through the volume of optical combiner 500 will impinge on recycle grating 530 more than three times.

Display light 532, 534, and 536 redirected back towards the outcoupler region will again impinge on the outcoupler optic 520. Consequently, portions of display light 532, 534, and 536 can be redirected by the outcoupler optic 520 to exit the volume of optical combiner 500, which increases the amount of display light which forms a display viewable by a user. FIG. 5 shows display light 532, 534, and 536 as impinging on outcoupler optic 520 at the same points 521, 522, and 523 as discussed above, thus providing greater brightness for the corresponding exit pupils. However, it is also possible for display light redirected back towards the outcoupler region to impinge on different points of outcoupler optic 520, such that this redirected light will be redirected to exit the volume of the optical combiner 500 at different points, creating additional exit pupils. This concept is discussed in greater detail with reference to FIGS. 6, 8, 9, and 10 below.

Additionally, each time display light 532, 534, and 536 impinge on outcoupler optic 520, a portion of display light will be redirected to exit the volume of optical combiner 500. Consequently, for each point at which a portion of display light redirected back towards the outcoupler region impinges on outcoupler optic 520, outcoupler optic 520 will redirect less display light to exit the volume of the optical combiner 500 compared to a previously impinged point. In the example of FIG. 5, less of display light 532, 534, and 536 will be redirected to exit a volume of the optical combiner 500 at point 522 than at point 523. Similarly, less of display light 532, 534, and 536 will be redirected to exit a volume of the optical combiner 500 at point 521 than at point 522. This is for similar reasons to those discussed above regarding the efficiency of outcoupler optic 520 as display light first passes through the outcoupler region. Notably, the decrease in display light redirected to exit the volume of the optical combiner 500 for display light from recycle optic 530 at each point will be in the opposite direction compared to display light passing through the outcoupler region for the first time from incoupler optic 510. Thus, light redirected back towards the outcoupler region by recycle optic 530 will help to offset non-uniformity of light exiting the volume of the optical combiner 500.

Recycle optic 530 in FIG. 5 is shown as being immediately adjacent to outcoupler optic 520. However, it is also possible for recycle optic 530 to be separated from outcoupler optic by a gap, as discussed later with reference to FIG. 8. As another example, recycle optic 530 could be implemented as a secondary optical function of outcoupler optic 520, positioned at an area of outcoupler optic 520 which is near to where display light would exit the outcoupler region without being redirected to exit the volume of optical combiner 500.

Recycle optics can be implemented in a variety of ways, as shown in several examples in FIGS. 6-12 discussed below.

Figure 6:
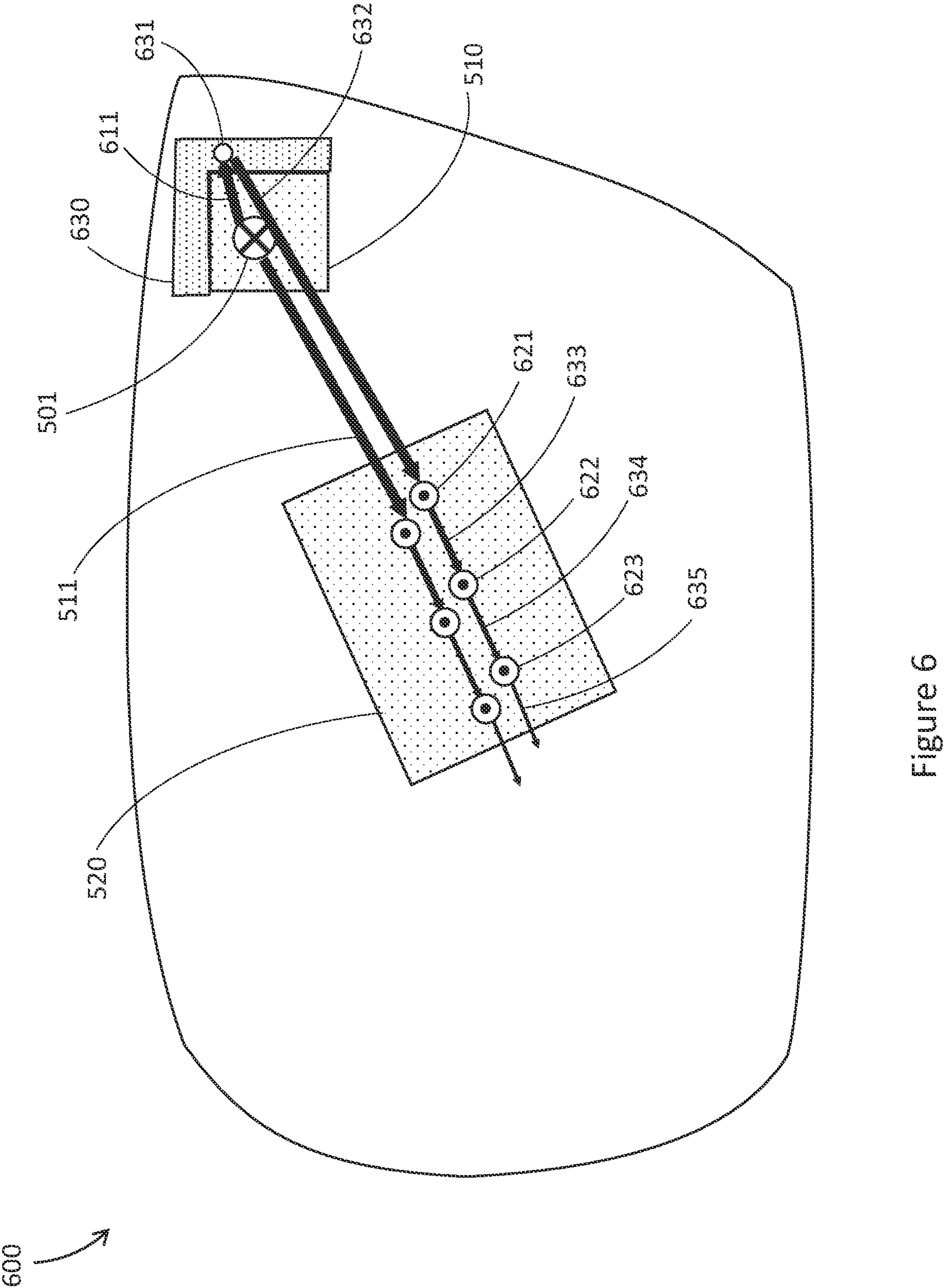
FIG. 6 is an orthogonal view of an optical combiner comprising an incoupler optic, an outcoupler optic, and a recycle optic, in accordance with another exemplary implementation.

FIG. 6 is an orthogonal view of an optical combiner 600. Optical combiner 600 can be similar in at least some respects to optical combiner 500 in FIG. 5. For example, optical combiner 600 can include an incoupler region comprising incoupler optic 510 and an outcoupler region comprising outcoupler optic 520. Description relating to components in FIG. 5 can be applicable to similarly numbered components in FIG. 6.

As with optical combiner 500 in FIG. 5, incoupler optic 510 of optical combiner 600 in FIG. 6 can receive display light 501 from outside the volume of the optical combiner, such as from a light engine. Display light 501 can be redirected by incoupler optic 510 to travel in the volume of optical combiner 600. A portion of display light 501 redirected to travel in the volume of optical combiner 600 can be redirected by incoupler optic 510 to travel towards the outcoupler region including outcoupler optic 520, illustrated as display light 511, similar to as described with reference to FIG. 5. Outcoupler optic 520 can redirect a portion of display light 511 to exit the volume of optical combiner 600 each time display light 511 impinges on outcoupler optic 520, similar as described with reference to FIG. 5.

One difference between optical combiner 600 in FIG. 6 and optical combiner 500 in FIG. 5 is that in FIG. 6, incoupler optic 510 directs a portion of display light 501 to travel in the volume of the optical combiner 600 away from the outcoupler region, illustrated as display light 611. This effect can arise due to the structure of incoupler optic 510. As one example, if incoupler optic 510 is a diffractive grating, display light impingent thereon can be directed to travel in multiple diffractive orders, which can include the display light be directed to travel in the volume of the optical combiner in multiple directions. Absent any recycle optics, display light 611 may not be redirected to exit the volume of the optical combiner 600 as display light visible to a user, and thus display light 611 can be wasted.

To address this issue, optical combiner 600 in FIG. 6 includes a recycle region comprising a recycle optic 630 positioned adjacent or near the incoupler optic 510. In the example of FIG. 6, recycle optic 630 is positioned along two sides of incoupler optic 510, but in practice recycle optic 630 could be larger or smaller, and could cover more or less area around the incoupler optic 510. Generally, the incoupler optic 510 is positioned laterally between the recycle optic 630 and the outcoupler optic 520. Further, recycle optic 630 is shown in FIG. 6 as being immediately adjacent incoupler optic 510, but it is also possible for recycle optic 630 to be separated from incoupler optic 510 by a gap. As another example, recycle optic 630 could be implemented as a secondary optical function of incoupler optic 510, positioned at an area of incoupler optic 510 which is near to where display light 611 would otherwise exit the incoupler region without being redirected towards the outcoupler region.

The recycle region in FIG. 6 receives display light 611 travelling in the volume of optical combiner 600. Display light 611 can impinge on recycle optic 630 at a point 631, where recycle optic 630 will redirect at least a portion of display light 611 towards the outcoupler region, illustrated as display light 632. If recycle optic 630 were 100% efficient, all of display light 611 could be redirected towards the outcoupler region as display light 632. However, recycle optic 630 may be less than 100% efficient, and thus a portion of display light 611 may pass beyond point 631 without being redirected by recycle optic 630 towards the outcoupler region. To address this, recycle optic 630 could cover a larger area, such that a portion of display light 611 which passes beyond point 631 may impinge on recycle optic 630 more times, resulting in additional portions of display light 611 being redirected towards the outcoupler region, similar to recycle optic 530 in FIG. 5.

Display light 632 can travel through the volume of optical combiner 600 towards the outcoupler region which includes outcoupler optic 520. Display light 632 can impinge on outcoupler optic 520 at a point 621, where outcoupler optic 520 will redirect a portion of display light 632 to exit the volume of the optical combiner, but can also allow a portion of display light 632 to continue to travel in the volume of optical combiner 600, illustrated as display light 633. Similarly, display light 633 can impinge on outcoupler optic 520 at a point 622, where outcoupler optic 520 will redirect a portion of display light 633 to exit the volume of the optical combiner, but can also allow a portion of display light 633 to continue to travel in the volume of optical combiner 600, illustrated as display light 634. Similarly, display light 634 can impinge on outcoupler optic 520 at a point 623, where outcoupler optic 520 will redirect a portion of display light 634 to exit the volume of the optical combiner, but can also allow a portion of display light 634 to continue to travel in the volume of optical combiner 600, illustrated as display light 635. In summary, similar to as described with reference to FIG. 5 where display light 511 can be redirected to exit the volume of the optical combiner at points where display light 511 impinges on the outcoupler optic 520, display light 632 can also be redirected to exit the volume of optical combiner 600 at points where display light 632 impinges on the outcoupler optic 520. Further, in the implementation shown in FIG. 6, portions of both display light 511 and display light 632 can be redirected to exit the volume of the optical combiner 600 by outcoupler optic 520, which results in a greater amount of light being redirected to exit the volume of the optical combiner in the outcoupler region. In turn, this means more display light which is visible to a user, which can provide a brighter and/or more power efficient display.

Similarly to as discussed with reference to FIG. 5, FIG. 6 shows three points 621, 622, and 623 at which display light is redirected to exit the volume of optical combiner 500, but in practice the optical combiner 600 could be designed so the there are fewer or more points at which display light is redirected to exit the volume of the optical combiner 600. Exemplary factors which could be modified to control the number of bounces could be the thickness of optical combiner 600, or the area of outcoupler optic 520.

Incoupler optic 510, outcoupler optic 520, and recycle optic 630 could be positioned and oriented such that points 621, 622, and 623 where display light 632, 633, and 634 impinge on outcoupler optic 520 coincide with points at which display light 511 impinges on outcoupler optic 520. This could result in bright exit pupils, similar to as shown in FIG. 5. However, the implementation illustrated in FIG. 6 shows points 621, 622, and 623 being in a different position that points at which display light 511 impinges on outcoupler optic 520. This can be advantageous by providing more exit pupils across the optical combiner 600, which can improve the eyebox of the display. This can result from the relative positioning and orientation of incoupler optic 510, outcoupler optic 520, and recycle optic 630.

Another difference between optical combiner 600 in FIG. 6 and optical combiner 500 in FIG. 5 is that FIG. 6 does not show a recycle optic which redirects display light which has passed through the outcoupler region back towards the outcoupler region, akin to recycle optic 530 in FIG. 5. Such a recycle optic is not shown in FIG. 6 to reduce clutter, but it is within the scope of the present disclosure that any of the recycle optics described herein could be implemented together in a single optical combiner as appropriate for a given application. This concept is illustrated in FIG. 7 discussed below.

Figure 7:
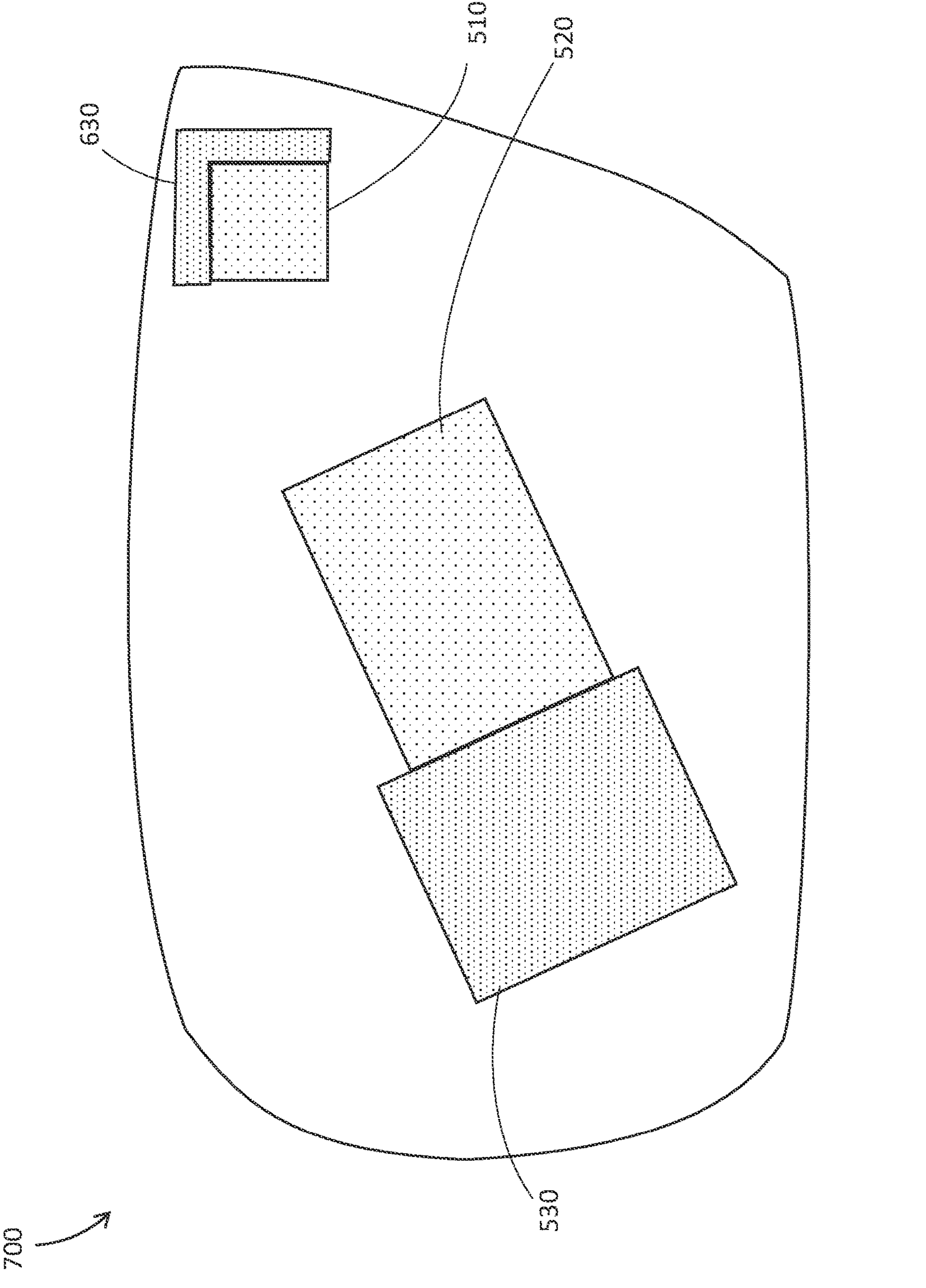
FIG. 7 is an orthogonal view of an optical combiner comprising an incoupler optic, an outcoupler optic, and multiple recycle optics, in accordance with one exemplary implementation.

FIG. 7 is an orthogonal view of an optical combiner 700, which can be similar in some respects to optical combiner 500 in FIG. 5 and optical combiner 600 in FIG. 6. The description of components in FIG. 5 and FIG. 6 can be applicable to similarly numbered components in FIG. 7. FIG. 7 illustrates an optical combiner 700 which can include an incoupler optic 510, an outcoupler optic 520, a recycle optic 530, and a recycle optic 630. Optical combiner 700 can provide greater power efficiency and/or display brightness than optical combiner 500 or optical combiner 600, by including multiple recycle optics. In particular, recycle optic 630 can redirect display light travelling through the volume of optical combiner 700 away from the outcoupler region to travel towards the outcoupler region, similar to recycle region 630 in FIG. 6. Further, recycle optic 530 can redirect display light which travels in the volume of optical combiner 700 through an outcoupler region without being redirected to exit the volume of the optical combiner 700 back towards the outcoupler region, similar to recycle region 530 in FIG. 5. Consequently, optical combiner 700 can achieve the display light recycling of both optical combiner 500 and optical combiner 600.

Figure 8:
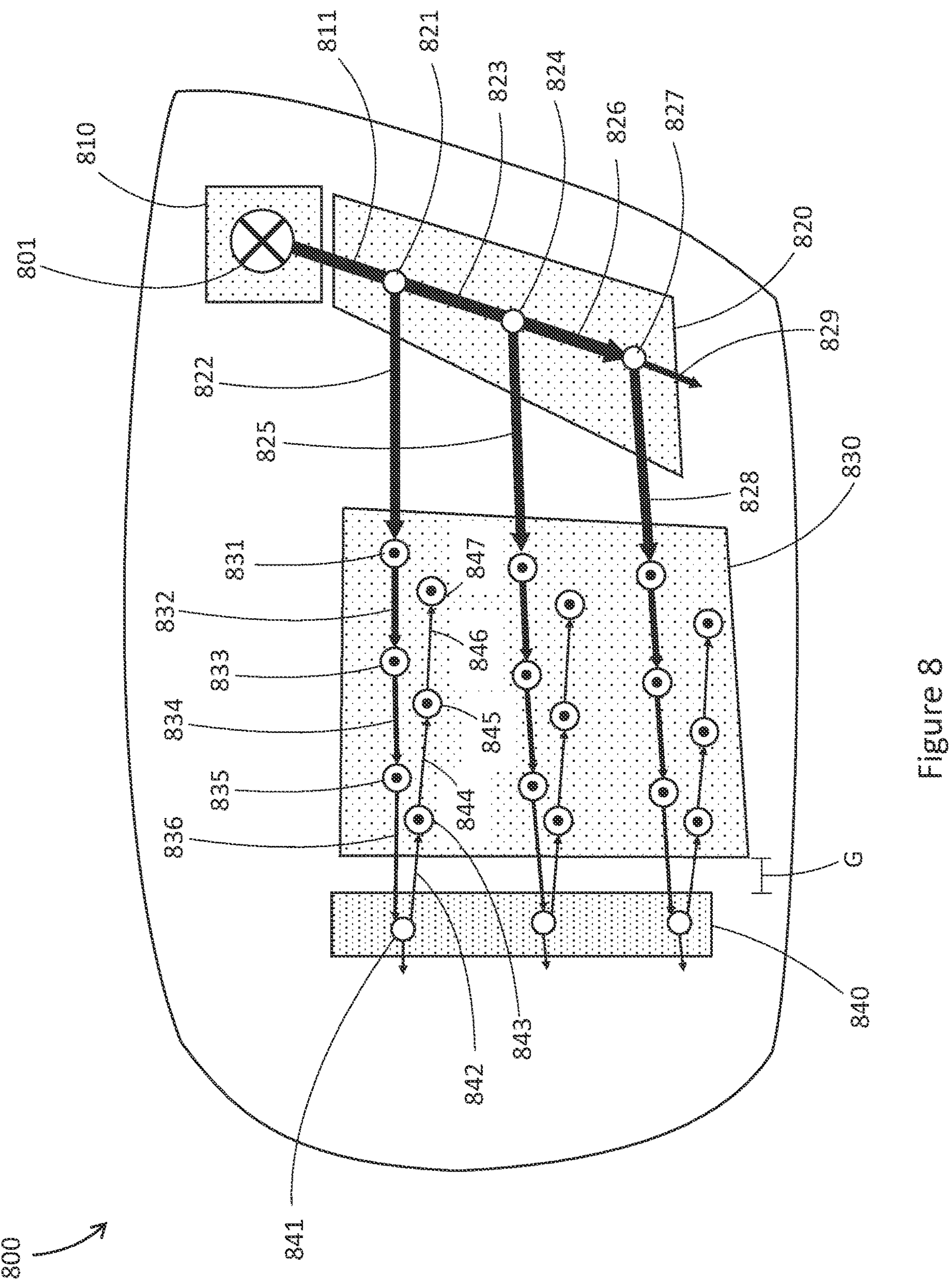
FIG. 8 is an orthogonal view of an optical combiner comprising an incoupler optic, an expander optic, an outcoupler optic, and a recycle optic, in accordance with one exemplary implementation.

FIG. 8 is an orthogonal view of an optical combiner 800, which can be similar in some respects to optical combiner 500 in FIG. 5, optical combiner 600 in FIG. 6, and optical combiner 700 in FIG. 7. The description of components in FIGS. 5, 6, and 7 can be applicable to similarly named components in FIG. 8.

FIG. 8 shows an optical combiner 800, which includes an incoupler region comprising an incoupler optic 810, an expander region comprising an expander optic 820, an outcoupler region comprising an outcoupler optic 830, and a recycle region comprising a recycle optic 840.

Incoupler optic 810 will receive display light 801 from outside the volume of the optical combiner 800, and redirect display light 801 to travel in the volume of optical combiner 800, illustrated as display light 811. Display light 811 will be received by expander optic 820. Expander optic 820 can redirect display light 811 to travel as a plurality of spatially separated portions of display light, so that the display light will cover a greater area and produce more exit pupils in the outcoupler region. In the example of FIG. 8, display light 811 impinges on expander optic 820 at a point 821, and a portion of display light 811 is redirected to travel in the volume of optical combiner 800 towards the outcoupler region, illustrated as display light 822. However, expander optic 820 may not be 100% efficient, such that a portion of display light 811 continues to travel in the volume of the optical combiner 800 without being redirected towards the outcoupler region, illustrated as display light 823. Display light 823 can impinge on expander optic 820 at a point 824, and expander optic 820 will redirect a portion of display light 823 to travel in the volume of optical combiner 800 towards the outcoupler region, illustrated as display light 825. A portion of display light 823 can continue to travel through the volume of optical combiner 800 without being redirected towards the outcoupler region, illustrated as display light 826. Display light 826 can impinge on expander optic 820 at a point 827, and expander optic 820 will redirect at least a portion of display light 826 to travel in the volume of optical combiner 800 towards the outcoupler region, illustrated as display light 828. A portion of display light 826 can continue to travel through the volume of optical combiner 800 without being redirected to travel towards the outcoupler region, illustrated as display light 829. In summary, the expander optic 820 of FIG. 8 receives display light 811 and produces three spatially separated portions of display light 822, 825, and 828 which travel through the volume of optical combiner 800 towards the outcoupler region. In practice, fewer or more spatially separated portions of light could be produced. This could be achieved for example by adjusting the thickness of optical combiner 800 so that display light 811 bounces between surfaces of optical combiner 800 more or less times in the expander region. As another example, expander optic 820 could cover a larger or smaller area so that display light 811 bounces more or less times in the expander region.

Display light 822, display light 825, and display light 828 can each travel in the volume of optical combiner 800 towards the outcoupler region comprising outcoupler optic 830. The below discussion details an optical path for display light 822; display light 825 and display light 828 can follow similar optical paths, spatially separated from the optical path of display light 822, as can be seen in FIG. 8. However, the specific optical path of display light 825 and display light 828 are not labelled with reference numerals, to avoid clutter.

Display light 822 can impinge on outcoupler optic 830 at a point 831, where outcoupler optic 830 can redirect a portion of display light 822 to exit the volume of the optical combiner 800. Another portion of display light 822 can continue to travel through the volume of optical combiner 800, illustrated as display light 832. Display light 832 can impinge on outcoupler optic 830 at a point 833, where outcoupler optic 830 can redirect a portion of display light 832 to exit the volume of the optical combiner 800. Another portion of display light 832 can continue to travel through the volume of optical combiner 800, illustrated as display light 834. Display light 834 can impinge on outcoupler optic 830 at a point 835, where outcoupler optic 830 can redirect a portion of display light 834 to exit the volume of the optical combiner 800. Another portion of display light 834 can continue to travel through the volume of optical combiner 800, illustrated as display light 836.

Similar to as described regarding outcoupler optic 520 in FIGS. 5, 6, and 7, outcoupler optic 830 can have a relatively low efficiency, in order to achieve more uniform exit pupil brightness. Consequently, absent any recycle optics, the portion of display light 836 which passes through the outcoupler region without being redirected to exit the volume of the optical combiner can be significant and can be effectively wasted. To address this issue, optical combiner 800 can include a recycle region comprising recycle optic 840, which can receive display light 836. Generally, the outcoupler optic 830 is positioned laterally between recycle optic 840, and expander optic 820 and incoupler optic 810. Display light 836 can impinge on recycle region 840 at point 841, where at least a portion of display light 836 can be redirected to travel in the volume of optical combiner 800 back towards the outcoupler region, illustrated as display light 842. If recycle optic 840 is 100% percent efficient, all of display light 836 could be redirected back towards the outcoupler region after impinging on recycle optic 840 at point 841. However, recycle optic 840 may not be 100% efficient, and thus at least some portion of display light 836 may continue to travel in the volume of optical combiner 800 away from the outcoupler region. Although FIG. 8 illustrates recycle optic 840 as being sized such that display light 836 only impinges thereon at one point 841, it is possible for display light 836 to impinge on recycle optic 840 more times, similar to as shown in FIG. 5. This could be achieved by making recycle optic 840 cover a larger area, and/or by making optical combiner 800 thinner, for example. As a result, a greater proportion of display light 836 may be redirected to travel in the volume of optical combiner 800 back towards the outcoupler region, at successive points at which display light 836 impinges on recycle optic 840.

Display light 842 travelling in the volume of optical combiner 800, back towards the outcoupler region from recycle optic 840, can impinge on outcoupler optic 830 at point 843. A portion of display light 842 can be redirected by outcoupler optic 830 to exit the volume of optical combiner 800, whereas a portion of display light 842 can continue to travel in the volume of optical combiner 800, illustrated as display light 844. Display light 844 can impinge on outcoupler optic 830 at point 845, where a portion of display light 844 can be redirected by outcoupler optic 830 to exit the volume of optical combiner 800, while a portion of display light 844 can continue to travel in the volume of optical combiner 800, illustrated as display light 846. Display light 846 can impinge on outcoupler optic 830 at point 847, where at least a portion of display light 846 can be redirected by outcoupler optic 830 to exit the volume of optical combiner 800.

In summary, recycle optic 840 can receive display light which passes through the outcoupler region without being redirected to exit the volume of optical combiner 800 (display light which would otherwise be wasted), and redirects the received display light back towards the outcoupler region so that at least some of the display light redirected back towards the outcoupler region can be redirected to exit the volume of the optical combiner 800 as visible light which forms a display. Thus, power efficiency and/or brightness can be improved. Further, light redirected back towards the outcoupler region from recycle optic 840 propagates in the opposite direction, such that the amount of display light redirected to exit the volume of the optical combiner 800 will be greater at point 843 than at point 845, and will be greater at point 845 than at point 847. This is in contrast to display light 822, which travels into the outcoupler region from expander optic 820, such that the amount of display light redirected to exit the volume of the optical combiner 800 will be greater at point 831 than at point 833, and will be greater at point 833 than at point 835. Consequently, display light redirected towards the outcoupler region by recycle optic 840 will help to make the overall distribution of display light exiting the volume of optical combiner 800 more uniform.

In the implementation illustrated in FIG. 8, each of points 831, 833, 835, 843, 845, and 847 are spatially separate, which results in a greater number of exit pupils for the display, thereby providing a larger eyebox. However, it is possible for incoupler optic 810, expander optic 820, outcoupler optic 830, and recycle optic 840 to be positioned and oriented so that certain points overlap. For example, point 831 could overlap with point 847, point 833 could overlap with point 845, and point 835 could overlap with point 843. This will result in each exit pupil being brighter. Further, FIG. 8 shows outcoupler optic 830 and recycle optic 840 being separated by a gap "G". The size of gap G could be adjusted to control the positions of exit pupils for light being redirected back towards the outcoupler region from recycle optic 840. Alternatively, gap G could be 0, such that outcoupler optic 830 and recycle optic 840 are immediately adjacent each other. As another example, recycle optic 840 could be implemented as a secondary optical function of outcoupler optic 830, positioned at an area of outcoupler optic 830 which is near to where display light would exit the outcoupler region without being redirected to exit the volume of optical combiner 800.

Notably, in any of the optical combiners described herein the exact position of optics in a given optical combiner can be changed as appropriate for a given application. FIG. 8 shows expander optic 830 as being positioned below incoupler optic 810 and to the right of outcoupler optic 830, but this orientation is not required. As another example, expander optic 830 could be positioned to the left of incoupler optic 810 and above outcoupler optic 830 and recycle optic 840 could be positioned below outcoupler optic 830. As yet another example, an optical combiner could include two expander optics, one positioned above the outcoupler optic and another positioned to the right of the outcoupler optic, to send more spatially separated portions of display light towards the outcoupler region. Such an optical combiner could include additional recycle optics, such as one to the left of the outcoupler optic and one below the outcoupler optic, to redirect display light of the additional spatially separated portions of display light which passes through the outcoupler region back towards the outcoupler region. Further, incoupler optic 810 could also be positioned differently; for example incoupler optic 810 may be positioned anywhere on the top area of the optical combiner, or any other area of the optical combiner, depending on where display light from a light engine should be received. Similar modifications to those described above could be implemented in any of the optical combiners described herein.

Figure 9:
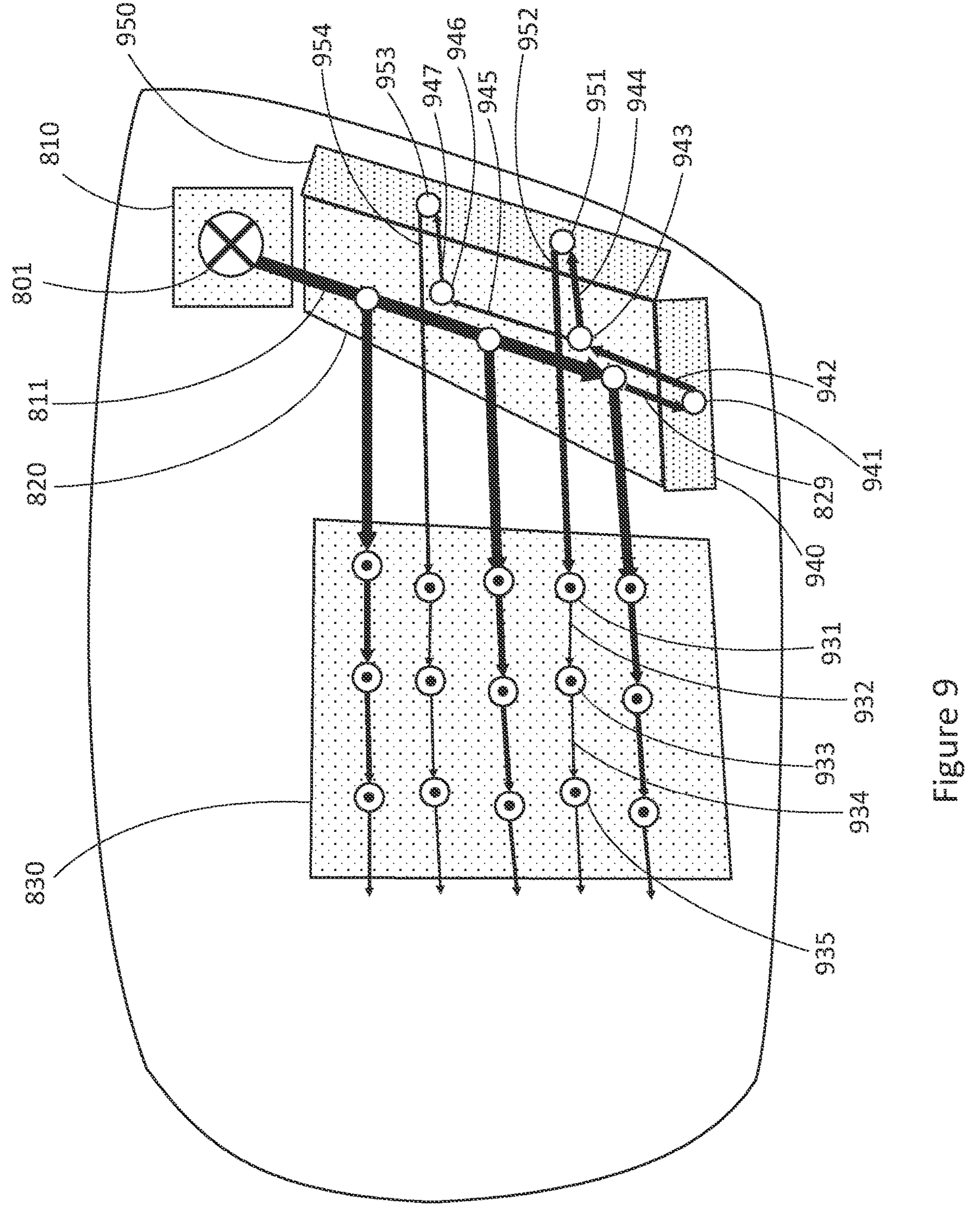
FIG. 9 is an orthogonal view of an optical combiner comprising an incoupler optic, an expander optic, an outcoupler optic, and two recycle optics, in accordance with another exemplary implementation.

FIG. 9 is an orthogonal view of an optical combiner 900, which can be similar in some respects to optical combiner 800 in FIG. 8. The description of components in FIG. 8 can be applicable to similarly numbered components in FIG. 9. For example, optical combiner 900 includes an incoupler optic 810, an expander optic 820, and an outcoupler optic 830, similar to those in optical combiner 800. Further, optical paths of display light from incoupler optic 810, to expander optic 820, to outcoupler optic 830, to exiting a volume of optical combiner 900, can be similar to those described with reference to optical combiner 800 in FIG. 8.

One difference between optical combiner 900 in FIG. 9 and optical combiner 800 in FIG. 8 is that optical combiner 900 includes a recycle region comprising a recycle optic 940 and a recycle optic 950 positioned adjacent expander optic 820. Generally, the expander optic 820 is positioned laterally between the incoupler optic 810 and the recycle optic 940, and the expander optic 820 is positioned laterally between the outcoupler optic 830 and the recycle optic 950. Display light 829, which passes through the expander region without being redirected towards the outcoupler region, can impinge on recycle optic 940 at a point 941, where at least a portion of display light 829 will be redirected back towards the expander region, illustrated as display light 942. If recycle optic 940 is 100% percent efficient, all of display light 829 could be redirected back towards the expander region as display light 942 after impinging on recycle optic 940 at point 941. However, recycle optic 940 may not be 100% efficient, and thus at least some portion of display light 829 may continue to travel in the volume of optical combiner 900 without being redirected back towards the expander region. Although FIG. 9 illustrates recycle optic 940 as being large enough such that display light 829 only impinges thereon at one point 941, it is possible for display light 829 to impinge on recycle optic 940 more times, similar to as shown in FIG. 5. This could be achieved by making recycle optic 940 cover a larger area, or by making optical combiner 900 thinner, for example. As a result, a greater proportion of display light 829 may be redirected to travel in the volume of optical combiner 900 back towards the expander region, at successive points at which display light 829 impinges on recycle optic 940.

Display light 942 redirected back towards the expander region by recycle optic 940 can impinge on expander optic 820 at point 943. Because the direction of propagation of display light 942 through the expander region is opposite that of display light 811, expander optic 820 can redirect a portion of display light 942 to travel through the volume of optical combiner 900 away from the outcoupler region, illustrated as display light 944. This can occur because of the structure of expander optic 820. For example, expander optic 820 can be a diffractive grating, which can redirect display light impingent thereon in many directions, according to different orders of diffraction. The direction of propagation if incident light can determine which orders of diffraction correspond to possible redirection of display light, such that display light propagating through the expander region in one direction can be redirected towards the outcoupler region, and display light propagating in another direction through the expander region can be redirected away from the outcoupler region.

Another portion of display light 942 may continue to travel through the volume of the optical combiner 900 without being redirected to travel away from the outcoupler region, illustrated as display light 945. Display light 945 can impinge on expander optic 820 at point 946, where at least a portion of display light 945 will be redirected to travel in the volume of optical combiner 900 away from the outcoupler region, illustrated as display light 947.

A recycle optic 950 can be positioned adjacent expander region 820 to receive display light 944 and display light 947. Display light 944 can impinge on recycle optic 950 at a point 951, where recycle optic 950 will send at least a portion of display light 944 towards the outcoupler region, illustrated as display light 952. Similarly, display light 947 will impinge on recycle optic 950 at a point 953, where recycle optic 950 will redirect at least a portion of display light 947 towards the outcoupler region, illustrated as display light 954. If recycle optic 950 is 100% percent efficient, all of display light 944 and display light 947 could be redirected towards the outcoupler region after impinging on recycle optic 950 at point 951 or point 953. However, recycle optic 950 may not be 100% efficient, and thus at least some portion of display light 944 and display light 947 may continue to travel in the volume of optical combiner 900 without being redirected towards the outcoupler region. Although FIG. 9 illustrates recycle optic 950 as being sized such that display light 944 only impinges thereon at one point 951, and display light 947 only impinges thereon at one point 953, it is possible for display light 944 and display light 947 to each impinge on recycle optic 950 more times, similar to as shown in FIG. 5. This could be achieved by making recycle optic 950 cover a larger area, or by making optical combiner 900 thinner, for example. As a result, a greater proportion of display light 944 and display light 947 may be redirected to travel in the volume of optical combiner 900 towards the outcoupler region, at successive points at which display light 944 and display light 947 impinge on recycle optic 950.

Display light 952 redirected towards the outcoupler region by recycle optic 950 can impinge on outcoupler optic 830 at a point 931, where a portion of display light 952 will be redirected to exit the volume of optical combiner 900, and a portion of display light 952 will continue to travel in the volume of optical combiner 900, illustrated as display light 932. Display light 932 can impinge on outcoupler optic 830 at a point 933, where a portion of display light 932 will be redirected to exit the volume of optical combiner 900, and a portion of display light 932 will continue to travel in the volume of optical combiner 900, illustrated as display light 934. Display light 934 can impinge on outcoupler optic 830 at a point 935, where at least a portion of display light 934 will be redirected to exit the volume of optical combiner 900.

An optical path of display light 954 through outcoupler optic 830 can be similar to the optical path of display light 952 through outcoupler optic 830 described above, as can be seen in FIG. 9. However, the optical path of display light 954 through outcoupler optic 830 is not labelled with reference numerals, to reduce clutter.

As can be seen in FIG. 9, an optical path of display light 952 through the outcoupler region comprising outcoupler optic 830, and an optical path of display light 954 through the outcoupler region comprising outcoupler optic 830 can be similar to optical paths of spatially separated portions of display light from expander optic 820, as discussed with reference to FIG. 8. As exemplified in FIG. 9, incoupler optic 810, expander optic 820, outcoupler optic 830, recycle optic 940, and recycle optic 950 could be positioned and oriented so that optical paths of display light 952 and display light 954 through outcoupler optic 830 are spatially separated from optical paths of spatially separated portions of display light from expander optic 820, in order to form additional exit pupils. Alternatively, incoupler optic 810, expander optic 820, outcoupler optic 830, recycle optic 940, and recycle optic 950 could be positioned and oriented so that points at which display light 952 and display light 954 are redirected by outcoupler optic 830 to exit the volume of optical combiner 900 coincide with points at which display light from the expander optic 820 are redirected by outcoupler optic 830 to exit the volume of optical combiner 900, thereby providing brighter exit pupils.

Similar to as discussed throughout this disclosure, the number of point at which display light impinges on expander optic 820 and outcoupler optic 830 could be adjusted by making the expander optic 820 and/or the outcoupler optic 830 cover a larger area, or by adjusting the thickness of optical combiner 800, for example.

Recycle optic 940 and recycle optic 950 are shown in FIG. 9 as being immediately adjacent to expander optic 820. However, in some implementations recycle optic 940 and/or recycle optic 950 could be spatially separated from expander optic 820 by a gap. As another example, recycle optic 940 and/or recycle optic 950 could be implemented as secondary optical functions of expander optic 820, positioned at peripheral areas of expander optic 820.

Another difference between optical combiner 900 in FIG. 9 and optical combiner 800 in FIG. 8 is that optical combiner 900 is not illustrated as including a recycle optic 840 positioned adjacent the outcoupler optic 830. However, such a recycle optic 840 could be included, as discussed later with reference to FIG. 11.

Figure 10:
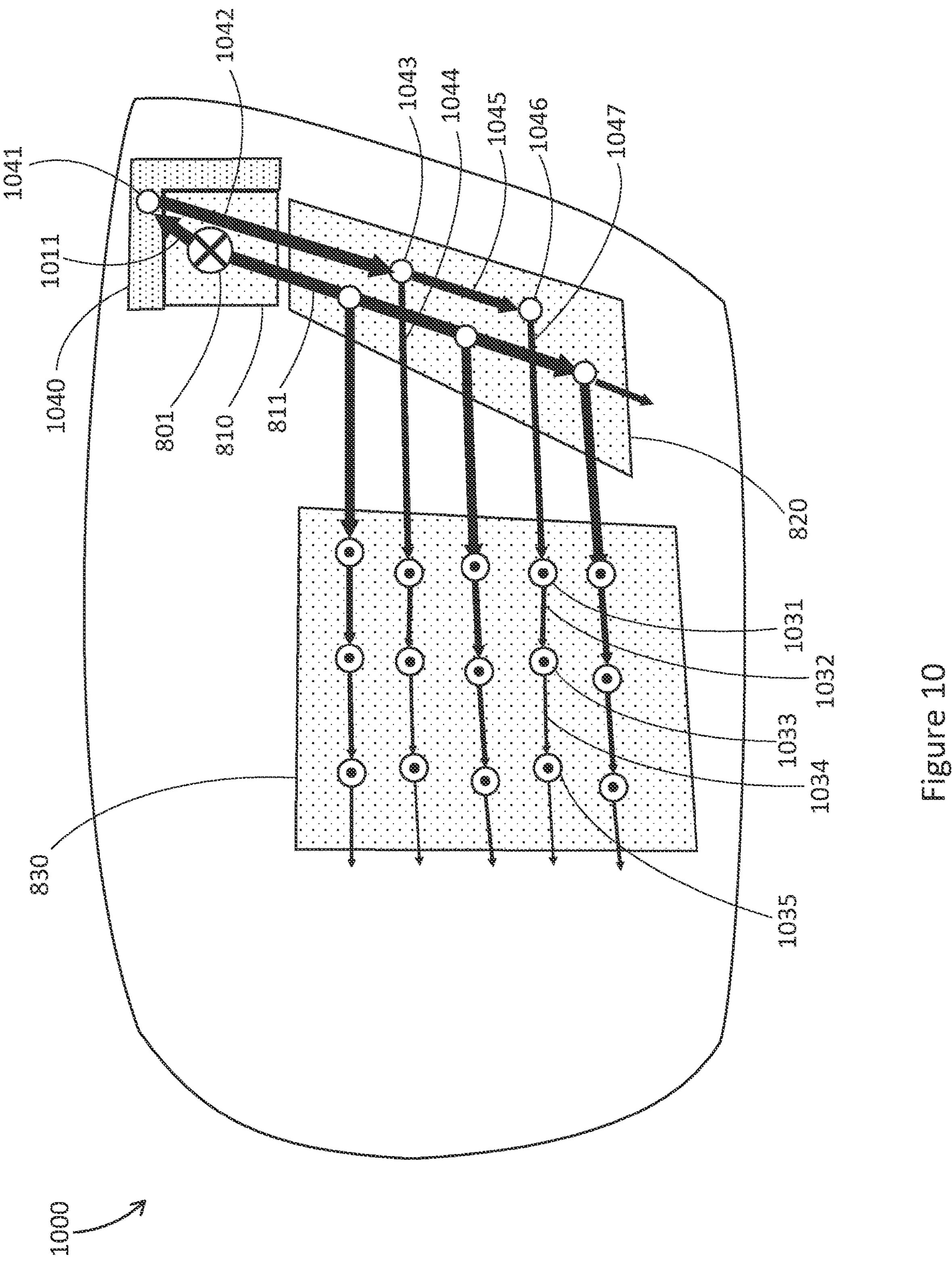
FIG. 10 is an orthogonal view of an optical combiner comprising an incoupler optic, an expander optic, an outcoupler optic, and a recycle optic, in accordance with yet another exemplary implementation.

FIG. 10 is an orthogonal view of an optical combiner 1000, which can be similar in some respects to optical combiner 800 in FIG. 8 and optical combiner 900 illustrated in FIG. 9. The description of components in FIG. 8 and FIG. 9 can be applicable to similarly numbered components in FIG. 10. For example, optical combiner 1000 includes an incoupler optic 810, an expander optic 820, and an outcoupler optic 830, similar to those in optical combiner 800 and optical combiner 900. Further, optical paths of display light from incoupler optic 810, to expander optic 820, to outcoupler optic 930, to exiting a volume of optical combiner 1000, can be similar to those described with reference to optical combiner 800 in FIG. 8.

One difference between optical combiner 1000 in FIG. 10 and optical combiner 800 in FIG. 8 is that optical combiner 1000 includes a recycle region comprising a recycle optic 1040 positioned adjacent incoupler optic 810. Generally, the incoupler optic 810 is positioned laterally between the expander optic 820 and the recycle optic 1040. Similar to as described with reference to FIG. 8, incoupler optic 810 receives display light 801 from outside a volume of optical combiner 1000, such as from a light engine. Incoupler optic 810 redirects a portion of display light 801 to travel in the volume of the optical combiner 1000 towards the expander region, illustrated as display light 811. Incoupler optic 810 also redirects another portion of display light 801 to travel in the volume of optical combiner 1000 away from the expander region, illustrated as display light 1011. This effect can arise due to the structure of incoupler optic 810. As one example, if incoupler optic 810 is a surface relief grating, display light impingent thereon can be directed to travel in the volume of the optical combiner in multiple directions. Absent any recycle optics, display light 1011 may not be redirected to exit the volume of the optical combiner 1000 as display light visible to a user, and thus display light 1011 can be wasted.

Recycle optic 1040 addresses this issue. In the example of FIG. 10, recycle optic 1040 is positioned along two sides of incoupler optic 810, but in practice recycle optic 1040 could be larger or smaller, and could cover more or less area around the incoupler optic 810. Further, recycle optic 1040 is shown in FIG. 10 as being immediately adjacent incoupler optic 810, but it is also possible for recycle optic 1040 to be separated from incoupler optic 810 by a gap. As another example, recycle optic 1040 could be implemented as a secondary optical function of incoupler optic 810, positioned at an area of incoupler optic 810 which is near to where display light 1011 would exit the incoupler region without being redirected towards the expander region.

The recycle region in FIG. 10 receives display light 1011 travelling in the volume of optical combiner 1000. Display light 1011 can impinge on recycle optic 1040 at a point 1041, where recycle optic 1040 will redirect at least a portion of display light 1011 towards the expander region, illustrated as display light 1042. If recycle optic 1040 were 100% efficient, all of display light 1011 could be redirected towards the outcoupler region as display light 1042. However, recycle optic 1040 may be less than 100% efficient, and thus a portion of display light 1011 may pass beyond point 1041 without being redirected by recycle optic 1040 towards the expander region. To address this, recycle optic 1040 could cover a larger area, or optical combiner 1000 could be thinner, such that a portion of display light 1011 which passes beyond point 1041 may impinge on recycle optic 1040 more times, resulting in additional portions of display light 1011 being redirected towards the expander region.

Display light 1042 redirected towards the expander region by recycle optic 1040 will impinge on expander optic 820 at a point 1043, where a portion of display light 1042 is redirected towards the outcoupler region as display light 1044. Another portion of display light 1042 may continue to travel through the volume of optical combiner 1000 without being redirected towards the outcoupler region, illustrated as display light 1045. Display light 1045 will impinge on expander optic 820 at a point 1046, where at least a portion of display light 1045 is redirected towards the outcoupler region as display light 1047.

Display light 1047 redirected towards the outcoupler region by expander optic 820 can impinge on outcoupler optic 830 at a point 1031, where a portion of display light 1047 will be redirected to exit the volume of optical combiner 1000, and a portion of display light 1047 will continue to travel in the volume of optical combiner 1000, illustrated as display light 1032. Display light 1032 can impinge on outcoupler optic 830 at a point 1033, where a portion of display light 1032 will be redirected to exit the volume of optical combiner 1000, and a portion of display light 1032 will continue to travel in the volume of optical combiner 1000, illustrated as display light 1034. Display light 1034 can impinge on outcoupler optic 830 at a point 1035, where at least a portion of display light 1034 will be redirected to exit the volume of optical combiner 1000.

An optical path of display light 1044 through the outcoupler region that comprises outcoupler optic 830 can be similar to the optical path of display light 1047 through the outcoupler region that comprises outcoupler optic 830 described above, as can be seen in FIG. 10. However, the optical path of display light 1044 through the outcoupler region is not labelled with reference numerals, to reduce clutter.

As can be seen in FIG. 10, an optical path of display light 1047 through the outcoupler region comprising outcoupler optic 830, and an optical path of display light 1044 through the outcoupler region can be similar to optical paths of spatially separated portions of display light 811 redirected by the expander optic 820, as discussed with reference to FIG. 8. As exemplified in FIG. 10, incoupler optic 810, expander optic 820, outcoupler optic 830, and recycle optic 1040 could be positioned and oriented so that optical paths of display light 1047 and display light 1044 through the outcoupler region are spatially separated from optical paths of spatially separated portions of display light 811 redirected by expander optic 820, in order to form additional exit pupils. Alternatively, incoupler optic 810, expander optic 820, outcoupler optic 830, and recycle optic 1040 could be positioned and oriented so that points at which display light 1047 and display light 1044 are redirected by outcoupler optic 830 to exit the volume of optical combiner 1000 coincide with points at which portions of display light 811 redirected by the expander optic 820 are redirected by outcoupler optic 830 to exit the volume of optical combiner 1000, thereby providing brighter exit pupils.

Similar to as discussed throughout this disclosure, the number of point at which display light impinges on expander optic 820 and outcoupler optic 830 could be adjusted by making the expander optic 820 and/or the outcoupler optic 830 cover a larger area, or by adjusting the thickness of optical combiner 800, for example.

Another difference between optical combiner 1000 in FIG. 10 and optical combiner 800 in FIG. 8 is that optical combiner 1000 is not illustrated as including a recycle optic 840 positioned adjacent the outcoupler optic 830. However, such a recycle optic 840 could be included, as discussed below with reference to FIG. 11.

Figure 11:
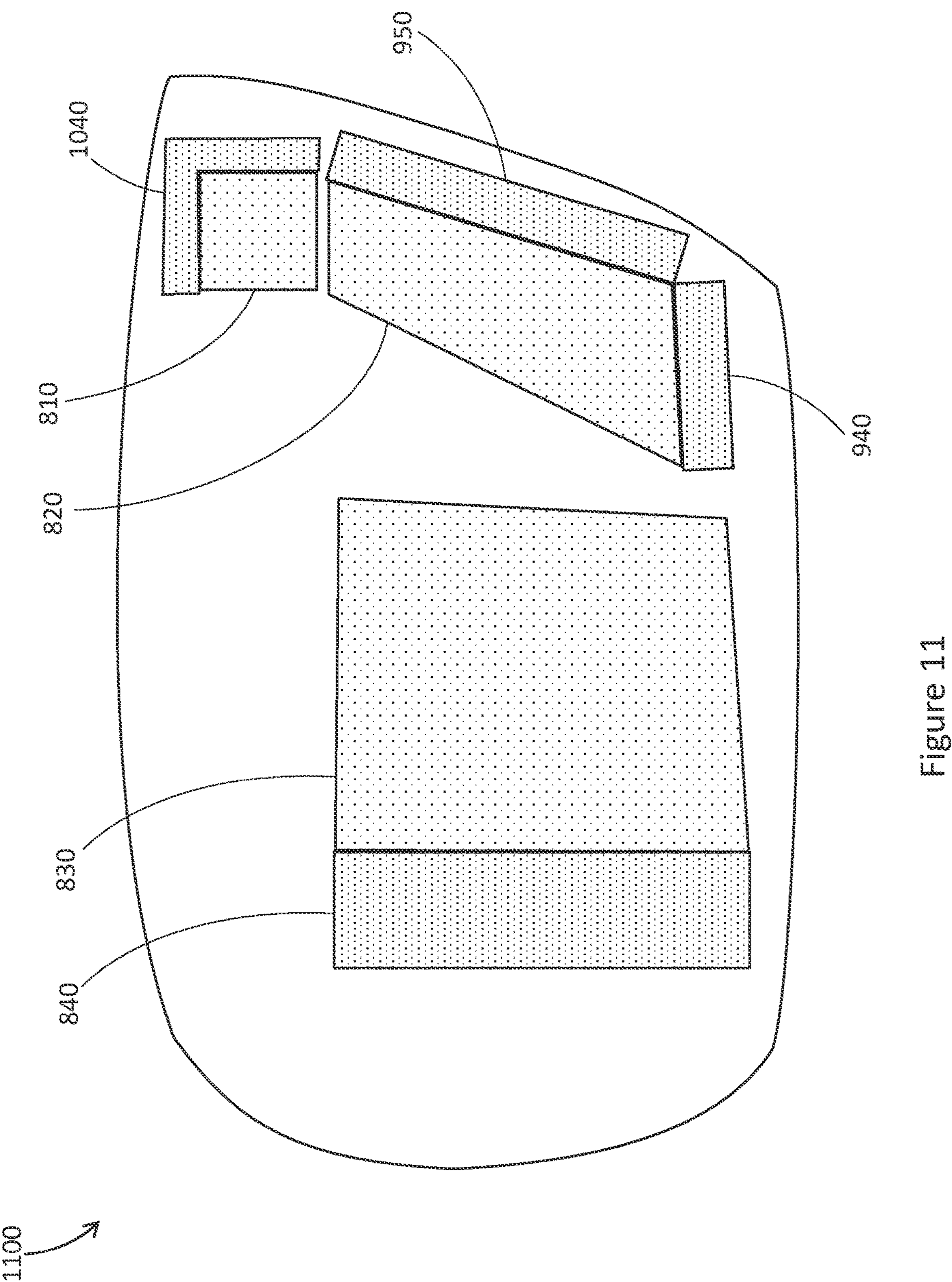
FIG. 11 is an orthogonal view of an optical combiner comprising an incoupler optic, an expander optic, an outcoupler optic, and multiple recycle optics, in accordance with one exemplary implementation.

FIG. 11 is an orthogonal view of an optical combiner 1100, which can be similar in some respects to optical combiner 800 in FIG. 8, optical combiner 900 in FIG. 9, and optical combiner 1000 in FIG. 10. The description of components in FIGS. 8, 9, and 10 can be applicable to similarly numbered components in FIG. 11. FIG. 11 illustrates an optical combiner 1100 which can include an incoupler optic 810, an expander optic 820, an outcoupler optic 830, a recycle optic 840, a recycle optic 940, a recycle optic 950, and a recycle optic 1040. Optical combiner 1100 can provide greater power efficiency and/or display brightness than optical combiner 800, optical combiner 900, or optical combiner 1000 by including multiple recycle optics. In particular, recycle optic 840 can redirect display light which travels in the volume of optical combiner 1100 through an outcoupler region comprising outcoupler optic 830 without being redirected to exit the volume of the optical combiner 1100 back towards the outcoupler region, similar to recycle region 840 in FIG. 8. Further, recycle optic 940 and recycle optic 950 can redirect display light which travels in the volume of optical combiner 1100 through an expander region comprising expander optic 820 without being redirected towards an outcoupler region to travel towards the outcoupler region, similar to recycle optic 940 and recycle optic 950 in FIG. 9. Further still, recycle optic 1040 can redirect display light travelling through the volume of optical combiner 1100 away from the outcoupler region to travel towards the outcoupler region, similar to recycle region 1040 in FIG. 10. Consequently, optical combiner 1100 can achieve the display light recycling of optical combiner 800, optical combiner 900, and optical combiner 1000. Additionally, each of recycle optic 840, recycle optic 940, recycle optic 950, and recycle optic 1040 are not required together in a single optical combiner. Rather, any appropriate combination of recycle optics could be implemented together as desired for a given application.

Figure 12:
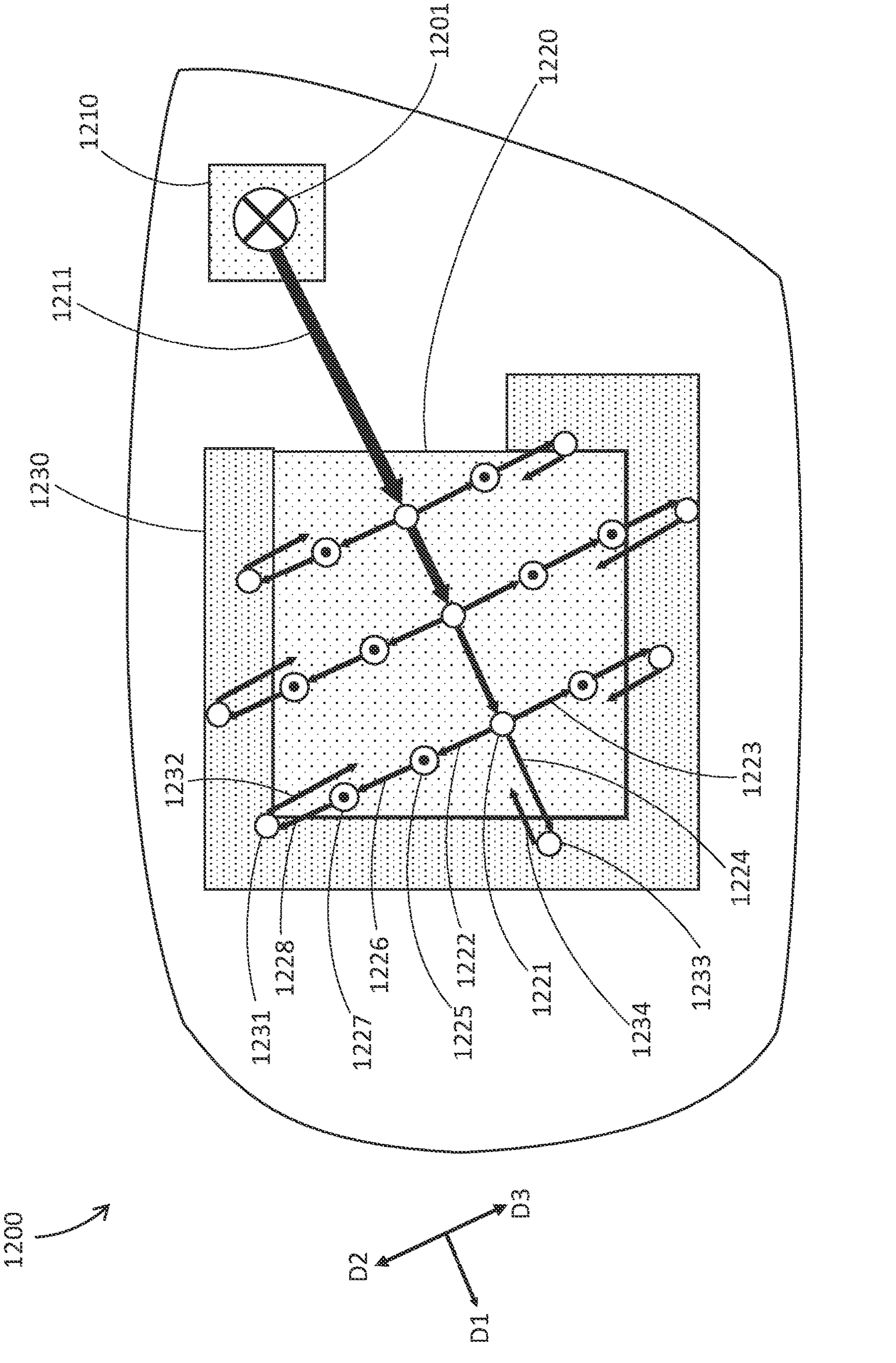
FIG. 12 is an orthogonal view of an optical combiner comprising an incoupler optic, an outcoupler optic, and a recycle optic, in accordance with one exemplary implementation.

FIG. 12 is an orthogonal view of an optical combiner 1200, which can be similar in some respects to optical combiner 500 in FIG. 5, optical combiner 600 in FIG. 6, optical combiner 700 in FIG. 7, optical combiner 800 in FIG. 8, optical combiner 900 in FIG. 9, optical combiner 1000 in FIG. 10, and optical combiner 1100 in FIG. 11. The description of components in FIGS. 5, 6, 7, 8, 9, 10, and 11 can be applicable to similarly named components in FIG. 12.

FIG. 12 illustrates an optical combiner 1200 which can include an incoupler region comprising an incoupler optic 1210, an outcoupler region comprising an outcoupler optic 1220, and a recycle region comprising a recycle optic 1230. Incoupler region 1210 can receive display light 1201 from outside a volume of the optical combiner 1200, and redirect display light 1201 to travel through the volume of the optical combiner in a direction D1 towards the outcoupler region, illustrated as display light 1211. Outcoupler optic 1220 can be a two-dimensional optical grating, such that outcoupler optic 1220 expands received display light over a relatively large area, and redirects display light to exit the volume of the optical combiner 1200. Outcoupler optic 1220 can thereby create a display having a plurality of exit pupils. This is described in more detail below. Generally, the outcoupler optic 1220 is positioned laterally between the incoupler optic 1210 and the recycle optic 1230.

In the example of FIG. 12, the outcoupler region can receive display light 1211 travelling in direction D1 through the volume of the optical combiner 1200, and when display light 1211 impinges on outcoupler optic 1220, outcoupler optic 1220 can redirect display light 1211 to travel through the volume of optical combiner 1200 in multiple directions. This can be seen at each of the empty circles illustrated in outcoupler optic 1220, where a portion of light continues to travel in the first direction and two portions of light are redirected in other directions. This is numerically labelled for a point 1221 where a portion of display light 1211 which has travelled in direction D1 partway through the outcoupler region impinges on outcoupler optic 1220. At point 1221, outcoupler optic 1220 redirects a portion of display light 1211 to travel through the volume of optical combiner 1200 in direction D2 different from the direction D1, illustrated as display light 1222. Additionally, at point 1221, outcoupler optic 1220 redirects another portion of display light 1211 to travel through the volume of optical combiner 1200 in a direction D3 different from the direction D1 and the direction D2, illustrated as display light 1223. At point 1221, yet another portion of display light 1211 can continue to travel through the volume of optical combiner 1200 in the direction D1, illustrated as display light 1224 in FIG. 12. In the example shown in FIG. 12, the direction D2 and the direction D3 can be parallel but opposite directions, and direction D1 can be perpendicular to direction D2 and direction D3. However, outcoupler optic 1220 could be designed to achieve any appropriate relationship between directions. As one example, outcoupler optic 1220 could comprise a holographic optical grating, with a separate grating function for each direction of light.

In the context of the subject disclosure, descriptions of display light travelling in a certain direction do not require that the display light travel exactly parallel to the certain direction, but rather indicate that the display light generally travels in the direction. As an example, references to display light travelling in the directions D1, D2, and D3 in FIG. 13 may refer to display light travelling within an angular range of the respective direction. Examples of acceptable angular ranges could include 30°, 20°, 10°, 5°, 1°, or 0°, but could be any angular range as appropriate for a given application.

As can be seen in FIG. 12, portions of light redirected by outcoupler optic 1220 to travel in directions other than direction D1 can be redirected to exit the volume of optical combiner 1200 at points where said portions of light impinge on outcoupler optic 1220. An example is numerically labelled in FIG. 12, where display light 1222 travelling through the volume of optical combiner 1200 in direction D2 impinges on outcoupler optic at point 1225. A portion of display light 1222 is redirected to exit the volume of the optical combiner 1200 at point 1225 by outcoupler optic 1220, and a portion of display light 1222 continues to travel through the volume of the optical combiner 1200 in direction D2, illustrated as display light 1226. Further, display light 1226 impinges on optical combiner 1200 at point 1227, where a portion of display light 1226 is redirected to exit the volume of the optical combiner 1200 by outcoupler optic 1220, whereas a portion of display light 1226 continues to travel through the volume of the optical combiner 1200 in direction D2, illustrated as display light 1228.

From the above and FIG. 12, it can be understood that outcoupler optic 1220 is two-dimensional in the sense that outcoupler optic 1220 includes multiple optical functions: a function which redirects light travelling in a direction D1 to travel in other directions through the volume of the optical combiner 1200, and at least one other function that redirects light travelling the other directions to exit the volume of the optical combiner. For example, outcoupler optic 1200 could comprise a surface relief grating, where two optical grating functions are superimposed on top of each other. As another example, outcoupler optic could comprise a holographic medium, with two holographic grating functions recorded therein. Such holographic grating functions could be recorded in the same volume of holographic medium or could be recorded in separated holographic volumes layered on top of each other.

Optical combiner 1200 can include a recycle optic 1230 which can receive display light which passes through the outcoupler region without being redirected to exit the volume of optical combiner 1200, and can redirect the received display light back towards the outcoupler region. As one example, FIG. 12 shows display light 1228 which travels through the volume of the optical combiner 1200 in direction D2, out of the outcoupler region into the recycle region comprising recycle optic 1230. Display light 1228 can impinge on recycle optic 1230 at point 1231, where recycle optic 1230 will redirect at least a portion of display light 1228 back toward the outcoupler region, illustrated as display light 1232. Display light 1232 will thereby travel through the outcoupler region again, and will impinge on outcoupler optic 1220 at least one more time, such that at least some of display light 1232 can be redirected to exit the volume of optical combiner 1200 as display light visible to a user, similar to as described with reference to FIGS. 5, 6, 8, 9, and 10. This will improve brightness and/or power efficiency of the display. As another example, FIG. 12 shows display light 1224 travelling through the volume of optical combiner 1200 in the first direction, out of the outcoupler region into the recycle region comprising recycle optic 1230. Display light 1224 can impinge on recycle optic 1230 at point 1233, where recycle optic 1230 will redirect at least a portion of display light 1224 back toward the outcoupler region as display light 1234. Display light 1234 will thereby travel through the outcoupler region again, and will impinge on outcoupler optic 1220 at least one more time, such that at least some of display light 1234 can be redirected to travel in other directions through the volume of optical combiner 1200, and subsequently be redirected to exit the volume of optical combiner 1200 as display light visible to a user, similar to as described with reference to FIGS. 5, 6, 8, 9, and 10. This will improve brightness and/or power efficiency of the display.

Similar to as discussed above with reference to FIGS. 8, 9, and 10, recycle optic 1230 is illustrated in FIG. 12 as only being large enough for light which passed through the outcoupler region to impinge on recycle optic 1230 once. If recycle optic 1230 is not highly efficient, recycle optic 1230 could be made to cover a larger area, or optical combiner 1200 could be made thinner, as examples, so that display light will impinge thereon more than once, thereby increasing the amount of display light redirected back towards the outcoupler optic 1220.

FIG. 12 illustrates optical combiner 1200 including recycle optic 1230, positioned adjacent to and partly surrounding outcoupler optic 1220. However, the specific boundaries of recycle optic 1230 could be selected as appropriate for a given application. For example, recycle optic could be positioned adjacent only one side of outcoupler optic 1220, to reduce the area occupied by optics. In some implementations, recycle optic 1230 can be positioned immediately adjacent to outcoupler optic 1220. In some implementations, at least a portion of recycle optic 1230 could be spatially separated from outcoupler optic 1220 by a gap. As another example, recycle optic 1230 could be implemented as a secondary optical function of outcoupler optic 1220, positioned at an area of outcoupler optic 1220 which is near to where display light would exit the outcoupler region without being redirected to exit the volume of optical combiner 1200.

Further, optical combiner 1200 could include additional recycle optics to increase brightness and/or power efficiency. For example, a recycle optic could be positioned adjacent incoupler optic 1210, similar to recycle optic 630 shown in FIG. 6.

Figure 13:
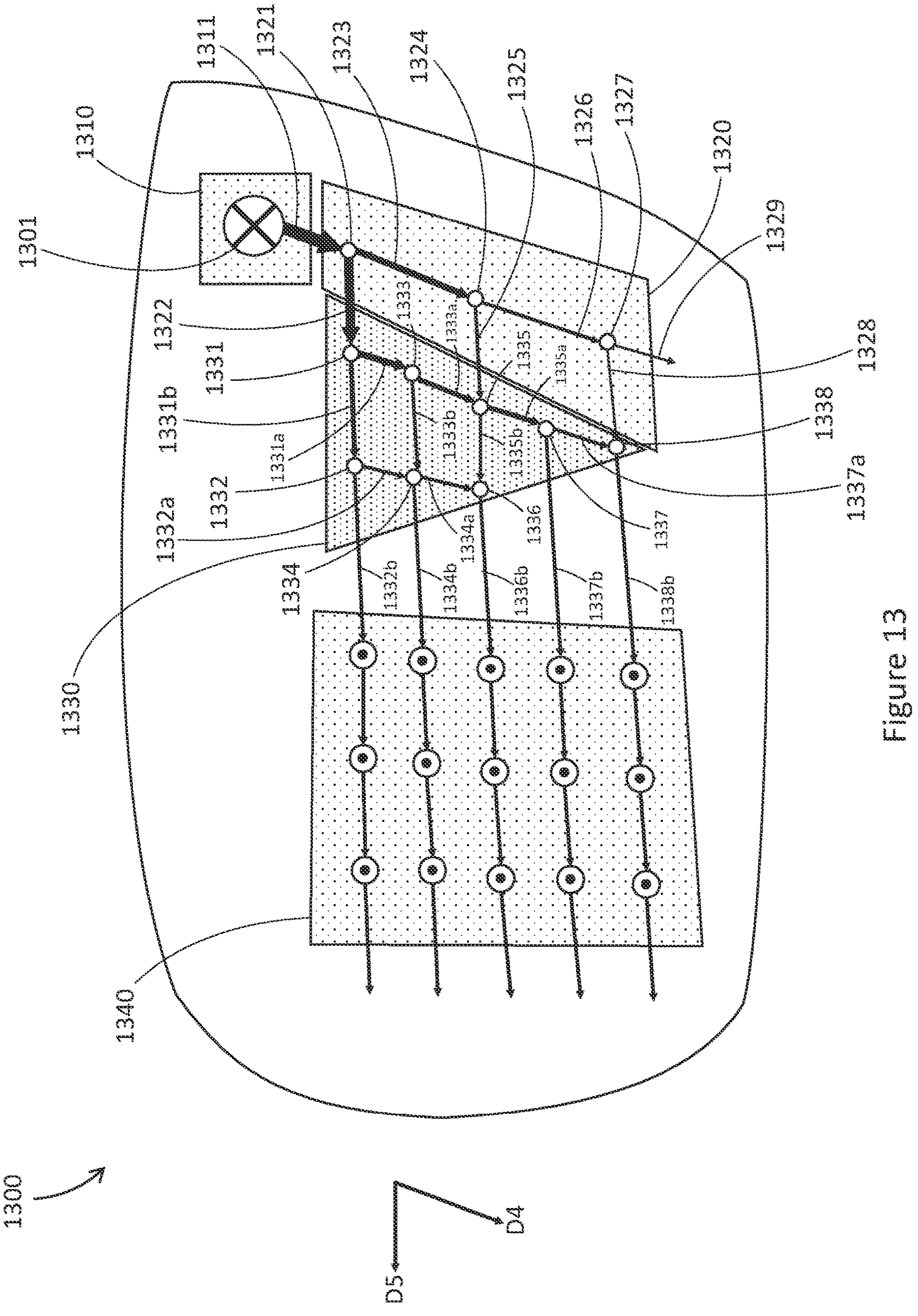
FIG. 13 is an orthogonal view of an optical combiner comprising an incoupler optic, an expander optic, a uniformization optic, and an outcoupler optic in accordance with one exemplary implementation.

FIG. 13 is an orthogonal view of an optical combiner 1300, which can be similar in some respects to optical combiner 500 in FIG. 5, optical combiner 600 in FIG. 6, optical combiner 700 in FIG. 7, optical combiner 800 in FIG. 8, optical combiner 900 in FIG. 9, optical combiner 1000 in FIG. 10, optical combiner 1100 in FIG. 11, and optical combiner 1200 in FIG. 12. The description of components in FIGS. 5, 6, 7, 8, 9, 10, 11, and 12 can be applicable to similarly named components in FIG. 13.

FIG. 13 shows an optical combiner 1300, which includes an incoupler region comprising an incoupler optic 1310, an expander region comprising an expander optic 1320, a uniformization region comprising a uniformization optic 1330, and an outcoupler region comprising an outcoupler optic 1340. Generally, the uniformization optic 1330 is positioned laterally between the expander optic 1320 and the outcoupler optic 1340.

Incoupler optic 1310 in FIG. 13 can be similar to incoupler optic 810 described with reference to FIG. 8. Incoupler optic 1310 will receive display light 1301 from outside the volume of the optical combiner 1300, and redirect display light 1301 to travel in the volume of optical combiner 1300, illustrated as display light 1311 travelling towards the expander region. FIG. 13 illustrates a direction D4 in which display light 1311 travels. In the context of the subject disclosure, descriptions of display light travelling in a certain direction do not require that the display light travel exactly parallel to the certain direction, but rather indicate that the display light generally travels in the direction. As an example, display light travelling in the direction D4 in FIG. 13 may refer to display light travelling within an angular range of the direction D4. Examples of acceptable angular ranges could include 30°, 20°, 10°, 5°, 1°, or 0°, but could be any angular range as appropriate for a given application. In the example of FIG. 13, display light 1311 can travel away from incoupler 1310 in a cone shape, where display light 1311 gradually diverges as it moves further from incoupler 1310.

Display light 1311 will be received by the expander region comprising expander optic 1320. Expander optic 1320 can redirect display light 1311 to travel as a plurality of spatially separated portions of display light in a direction D5 shown in FIG. 13, so that the display light will cover a greater area and produce more exit pupils in the outcoupler region. Direction D5 is non-parallel to direction D4, and could be perpendicular to direction D4, but in the example of FIG. 13 direction D5 is neither parallel nor perpendicular to D4. Similar to direction D4 discussed above, display light travelling in the direction D5 in FIG. 13 may refer to display light travelling within an angular range of the direction D5. Examples of acceptable angular ranges could include 30°, 20°, 10°, 5°, 1°, or 0°, but could be any angular range as appropriate for a given application.

No specific relationship is required between directions D1, D2, and D3 in FIG. 12, compared to directions D4 and D5 in FIG. 13. Rather, directions D4 and D5 in FIG. 13 are numbered as such to avoid overlapping reference numerals with D1, D2, and D3.

In the example of FIG. 13, display light 1311 impinges on expander optic 1320 at a point 1321, and a portion of display light 1311 is redirected to travel in the volume of optical combiner 1300 in direction D5 towards the uniformization region as display light 1322. However, expander optic may not be 100% efficient, and a portion of display light 1311 can continue to travel in the volume of the optical combiner 1300 in direction D4 without being redirected towards the uniformization region, illustrated as display light 1323. Display light 1323 can impinge on expander optic 1320 at a point 1324, and expander optic 1320 will redirect a portion of display light 1323 to travel in the volume of optical combiner 1300 in the direction D5 towards the uniformization region, illustrated as display light 1325. A portion of display light 1323 can continue to travel through the volume of optical combiner 1300 in the direction D4 without being redirected towards the uniformization region, illustrated as display light 1326. Display light 1326 can impinge on expander optic 1320 at a point 1327, and expander optic 1320 will redirect at least a portion of display light 1326 to travel in the volume of optical combiner 1300 in direction D5 towards the uniformization region, illustrated as display light 1328. A portion of display light 1326 can continue to travel through the volume of optical combiner 1300 in direction D4 without being redirected to travel towards the uniformization region, illustrated as display light 1329. In summary, the expander optic 1320 of FIG. 13 receives display light 1311 and produces three spatially separated portions of display light 1322, 1325, and 1328 which travel through the volume of optical combiner 1300 in the direction D5 towards the uniformization region. In practice, fewer or more spatially separated portions of light could be produced, such as by changing the area covered by expander optic 1320, or changing the thickness of optical combiner 1300 so that display light will impinge on expander optic 1320 more times.

Similar to as discussed above regarding FIG. 5, if expander optic 1320 were to have a relatively high efficiency, the spatially separated portions of display light would not have very uniform brightness, which would result in a display with non-uniform brightness. For example, if expander optic 1320 were 95% efficient, then display light 1322 would comprise 95% of the display light 1311; display light 1325 would comprise 4.75% of the display light 1311; and display light 1328 would comprise 0.2375% of display light 1311. Evidently, such a distribution of display light is not very uniform. This could be addressed by designing expander optic 1320 to have a lower efficiency. For example, if expander optic 1320 were 5% efficient, then display light 1322 would comprise 5% of the display light 1311; display light 1325 would comprise 4.75% of the display light 1311; and display light 1328 would comprise 4.5125% of display light 1311. This distribution of display light is more uniform, but 85.7375% of display light 1311 would pass through the expander region without being redirected towards the out-coupler region to produce a visible display. That is, display light 1329 in FIG. 13 would comprise 85.7375% of display light 1311, which is a significant waste.

In view of the above, it is desirable for expander optic 1320 to have a high efficiency overall to reduce wasted display light, but still maintain a uniform distribution of light. The present disclosure provides a solution to this issue, illustrated as uniformization optic 1330 in FIG. 13. Uniformization optic 1330 acts to receive at least one of the spatially separated portions of display light 1322, 1325, and 1328, and to redistribute display light from the brighter portions of display light (such as display light 1322) to areas in which dimmer portions of display light travel (such as display light 1328). This is described in detail below.

Display light 1322 is received by the uniformization region and impinges on the uniformization optic 1330 at point 1331. A sub-portion of display light 1322 is redirected by uniformization optic 1330 to travel in the direction D4, illustrated as display light 1331*a*. Display light 1331*a* will travel in direction D4 until impinging again on uniformization optic 1330 at point 1333, where a sub-portion of display light 1331*a* is redirected by uniformization optic 1330 to travel in the direction D5, illustrated as 1333*b*, while another sub-portion of display light 1331*a* continues to travel in the direction D4, illustrated as display light 1333*a*. Display light 1333*b* is a sub-portion of display light 1322, where display light 1333*b* has been shifted to be spatially separated from display light 1322. That is, a sub-portion 1333*b* of display light 1322 has been "tapped-off" and shifted to travel in direction D5 in an area where display light from expander optic 1320 is dimmer. In this case, sub-portion 1333*b* travels in an area between display light 1322 and display light 1325.

Display light 1333*a* which travels in direction D4 can impinge on uniformization optic 1330 at a point 1335, where a sub-portion of display light 1333*a* can be redirected to travel in direction D5, illustrated as display light 1335*b*. Display light 1335*b* in FIG. 13 can represent a combination of display light 1325 from the expander optic 1320 and a sub-portion of display light 1333*a* redirected by uniformization optic 1330. Display light 1333*a* is a sub-portion of display light 1322 which has been redirected by uniformization optic 1330; that is a sub-portion of display light 1322 is "tapped-off" by uniformization optic 1330 and redirected to contribute to the brightness of display light 1325. In summary, a sub-portion of display light 1322 (the brightest display light from the expander optic 1320) is redirected to another area where display light is dimmer (the area where display light 1325 travels).

At point 1335, a sub-portion of display light 1333*a* may continue to travel in direction D4, illustrated as display light 1335*a*. Additionally, display light 1325 can impinge on the uniformization optic 1330 at point 1335, and a portion of display light 1325 may be redirected to travel to travel in direction D4. Display light 1335*a* in FIG. 13 can represent a combination of a sub-portion of display light 1333*a* traveling in direction D4 and a sub-portion of display light 1325 traveling in direction D4. Display light 1335*a* may impinge on uniformization optic 1330 at a point 1337, where a sub-portion of display light 1335*a* will be redirected to travel in direction D5, illustrated as display light 1337*b*, and a sub-portion of display light 1335*a* will continue to travel in direction D4, illustrated as display light 1337*a*. Display light 1337*a* can impinge on uniformization optic 1330 at point 1338, where at least a portion of display light 1337*a* can be redirected to travel in direction D5, illustrated as display light 1338*b* in FIG. 13. Further, display light 1338*b* may represent a combination of display light 1328 and the sub-portion of display light 1337*a* redirected to travel in direction D5. In summary, a sub-portion of display light 1322 (the brightest display light from the expander optic 1320), and a sub-portion of display light 1325 (display light from the expander optic 1320 having moderate brightness), are redirected to another area where display light is dimmer (display light 1328 is the dimmest display light from expander optic 1320 illustrated in FIG. 13).

FIG. 13 illustrates three spatially separated portions of display light being redirected by expander optic 1320 to travel in direction D5 (display light 1322, display light 1325, and display light 1328). However, any appropriate number of spatially separated portions of light could be produced by expander optic 1320, for example by modifying the thickness of optical combiner 1400 and/or modifying the area of expander optic 1320.

Generally, it is desirable for the uniformization optic 1330 to redirect display light from brighter areas to dimmer areas, while minimizing the amount of light that is redirected away from dimmer areas. In the example of FIG. 13, the brightest display light (display light 1322) will travel through the top of the uniformization region (a region of the uniformization optic 1330 nearest the incoupler optic 1310), whereas the dimmest display light (display light 1328) will travel through the bottom of the uniformization region (a region of the uniformization optic 1330 furthest from the incoupler optic 1310). Thus, in the example of FIG. 13, it is preferable for more display light to be redirected from the top area of the uniformization region towards the bottom area of the uniformization region. This could be achieved in multiple ways. For example, uniformization optic 1330 could be an optical grating with a variable efficiency, with the efficiency in a top area being higher than an efficiency in a bottom area. That is, for an area of the uniformization optic 1330 near to the incoupler optic 1310, the uniformization optic 1330 can have a first efficiency, for an area of the uniformization optic 1330 distal to the incoupler optic 1310, the uniformization optic 1330 can have a second efficiency, the first diffraction efficiency greater than the second diffraction efficiency.

As another example, illustrated in FIG. 13, uniformization optic 1330 could have a larger width along direction D5 for a top area than a width along direction D5 for a bottom area. That is, for an area of the uniformization optic 1330 near to the incoupler grating 1310, the uniformization optic 1330 can have a first width in direction D5, for an area of the uniformization optic 1330 distal to the incoupler optic 1310, the uniformization optic 1330 can have a second width in the direction D5, the first width greater than the second width. This can be seen in FIG. 13, where display light 1322 travelling in direction D5 impinges on uniformization optic at point 1331, and a sub-portion of display light 1322 which continues to travel in direction D5, illustrated as display light 1331*b*, impinges on uniformization optic 1330 at point 1332. That is, display light 1322 impinges twice on uniformization optic 1330 in direction D5, compared to once for display light 1328. Impinging on uniformization optic 1330 more times will result in more display light being redirected towards an area where display light is dimmer. In particular, in the example of FIG. 13, at point 1332, display light 1331*b* impinges on uniformization optic 1330, where a sub-portion of display light 1331*b* is redirected to travel in direction D4 by uniformization optic 1330, illustrated as display light 1332*a*, and a sub-portion of display light 1331*b* continues to travel in direction D5, illustrated as display light 1332*b*. That is, a sub-portion of display light 1322 is "tapped-off" at point 1331, and another sub-portion of display light 1322 is "tapped-off" at point 1332.

At point 1334, a sub-portion of display light 1332*a* is redirected to travel in direction D5 by uniformization optic 1330, illustrated as display light 1334*b*. Display light 1334*b* can represent a combination of the sub-portion of display light 1332*a* redirected to travel in direction D5 by uniformization optic 1330 at point 1334, in addition to display light 1333*b* discussed above. Thus, sub-portions of display light 1322 can be redirected to travel in direction D5 spatially separated from display light 1322, thereby redirecting display light from a brighter region to a dimmer region.

Similarly, at point 1334 a sub-portion of display light 1333*b* can be redirected by uniformization optic 1330 to travel in direction D4, and a sub-portion of display light 1332*a* can continue to travel in the direction D4, the combination of which is illustrated as display light 1334*a*. At point 1336, at least a portion of display light 1334*a* can be redirected to travel in direction D5, in combination with display light 1335*b* discussed above, thereby increasing the brightness of display light travelling through a region where display light would otherwise be dimmer.

Impinging on the uniformization optic 1330 once or twice as discussed above are merely examples of how many times display light can impinge on the uniformization optic 1330, and display light may impinge on the uniformization optic 1330 any amount of times as appropriate for a given application, such as by designing the shape and area covered by uniformization optic 1330.

Display light 1332*b*, display light 1334*b*, display light 1336*b*, display light 1337*b*, and display light 1338*b* can each travel in the volume of optical combiner 1300 in direction D5 towards the outcoupler region comprising outcoupler optic 1340. Each of display light 1332*b*, display light 1334*b*, display light 1336*b*, display light 1337*b*, and display light 1338*b* can impinge on outcoupler optic 1340 at any appropriate number of points, based on for example the thickness of optical combiner 1300 and/or the area of outcoupler optic 1340. At each point where a given portion of display light impinges, at least a portion of the impinging display light can be redirected by outcoupler optic 1340 to exit the volume of the optical combiner, such that visible display light is outcoupled to be viewed by a user, similar to as described with reference to FIGS. 5, 6, 8, 9, 10, and 12.

The example of FIG. 13 shows spatially separate portions of display light from expander optic 1320 being further divided into sub-portions, which are redirected to produce additional exit pupils in the outcoupler region. For example, display light 1334*b* and display light 1337*b* travel in regions which are between the regions in which display light 1322, 1325, and 1328 would travel absent uniformization optic 1330. However, this is not necessary. Instead, uniformization optic 1330 could be designed to redirect sub-portions of display light to travel in the same areas in which display light 1322, 1325, and 1328 would travel absent uniformization optic 1330. That is, sub-portions of display light could be redirected to brighten the same exit pupils which would be created by the expansion optic 1320. Conversely, uniformization optic 1330 could be designed such that the sub-portions of display light do not directly brighten the same exit pupils which would be created by the expansion optic 1320, but instead only form new exit pupils in the outcoupler region.

FIG. 13 shows each of the spatially separated portions of display light 1322, 1325, and 1328 as impinging on uniformization optic 1330. However, it is possible to design optical combiner 1300 so that not all of the spatially separated portions of display light impinge on uniformization optic. For example, display light 1328 is dimmer than display light 1325 and display light 1322. Consequently, it may not be desirable for display light 1328 to impinge on uniformization optic 1330, since this will redirect a portion of display light 1328 to travel in direction D4. As one example, the width of uniformization optic 1330 could be small enough in the area travelled by display light 1328 that display light 1328 will not impinge on uniformization optic 1330. As another example, uniformization optic may not extend the full length of expander optic 1320 in direction D4.

Similar to as mentioned above, each of the incoupler optic 1310, expander optic 1320, uniformization optic 1330, and outcoupler optic 1340 could comprise an optical grating, such as a surface relief grating or a holographic grating. Further, because of uniformization optic 1330, expander optic 1320 can be designed to have a higher efficiency. As mentioned above, if the efficiency of expander optic is high, the spatially separated portions of light produced by the expander optic 1320 may not be very uniform. However, uniformization optic 1330 redistributes display light to provide a more uniform display light distribution, and thus the efficiency of expander optic 1320 can be increased while still maintaining acceptable display light uniformity. Consequently, efficiency of the optical combiner 1300 as a whole can be higher.

In some implementations, expander optic 1320 and uniformization optic 1330 can be immediately adjacent each other. In some implementations, expander optic 1320 and uniformization optic 1330 can be a continuous optic. In other implementations, expander optic 1320 and uniformization optic 1330 can be separated by a gap. In some implementations, uniformization optic 1330 could be implemented as a secondary optical function of expander optic 1320, positioned at an area of expander optic 1320 which is near to where display light would exit the expander optic 1320 towards the outcoupler region.

Figure 14:
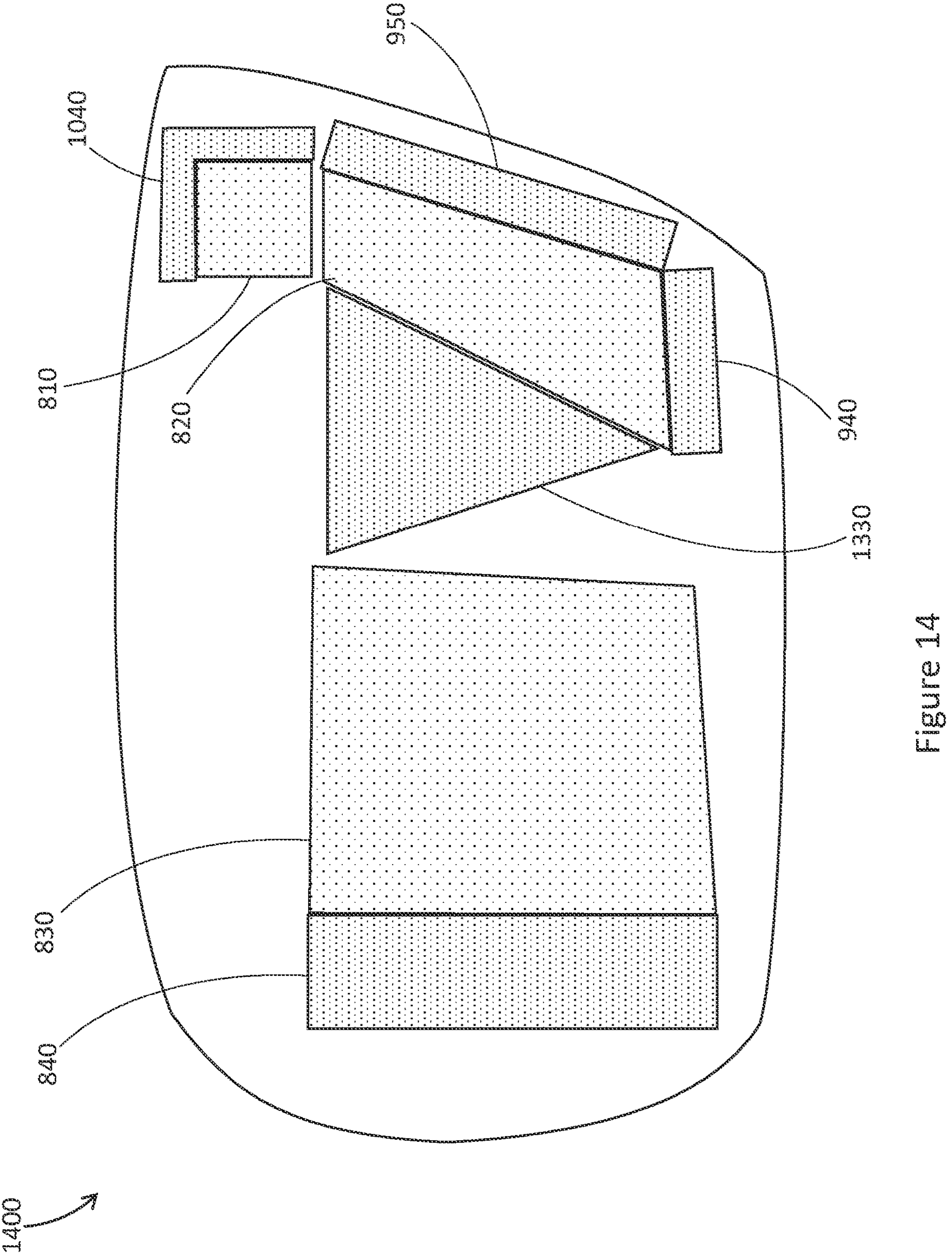
FIG. 14 is an orthogonal view of an optical combiner comprising an incoupler optic, an expander optic, a uniformization optic, an outcoupler optic, and multiple recycle optics, in accordance with one exemplary implementation.

FIG. 14 is an orthogonal view which illustrates an optical combiner 1400, which can be similar in at least some respects to optical combiner 800 in FIG. 8, optical combiner 900 in FIG. 9, optical combiner 1000 in FIG. 10, and optical combiner 1300 in FIG. 13. The description of components in FIGS. 8, 9, 10, and 13 can be applicable to similarly numbered components in FIG. 14. FIG. 14 illustrates an optical combiner 1400 which can include an incoupler optic 810, an expander optic 820, an outcoupler optic 830, a recycle optic 840, a recycle optic 940, a recycle optic 950, a recycle optic 1040, and a uniformization optic 1330. Optical combiner 1400 can provide greater power efficiency, display brightness, and/or display uniformity than optical combiner 800, optical combiner 900, optical combiner 1000, or optical combiner 1300 by including at least one recycle optic in addition to at least one uniformization optic. In particular, recycle optic 840 can redirect display light which travels in the volume of optical combiner 1400 through an outcoupler region without being redirected to exit the volume of the optical combiner 1400 back towards the outcoupler region, similar to recycle region 840 in FIG. 8. Further, recycle optic 940 and recycle optic 950 can redirect display light which travels in the volume of optical combiner 1400 through an expander region without being redirected towards an outcoupler region to travel towards the outcoupler region, similar to recycle optic 940 and recycle optic 950 in FIG. 9. Further still, recycle optic 1040 can redirect display light travelling through the volume of optical combiner 1400 away from the outcoupler region to travel towards the outcoupler region, similar to recycle region 1040 in FIG. 10. Further still, uniformization optic 1330 can receive display light from expander optic 820 and redistribute brighter portions of the received display light over areas through which less display light travels, to provide a more uniform display light distribution.

Consequently, optical combiner 1400 can achieve the display light recycling of optical combiner 800, optical combiner 900, and optical combiner 1000, while also achieving the display light uniformization of optical combiner 1300. Additionally, each of recycle optic 840, recycle optic 940, recycle optic 950, recycle optic 1040, and uniformization optic 1330 are not required together in a single optical combiner. Rather, any appropriate combination of recycle optics and uniformization optics could be implemented together as desired for a given application.

In some implementations, one or more optical fiber(s) may be used to guide light signals along some of the paths illustrated herein.

The WHUDs described herein may include one or more sensor(s) (e.g., microphone, camera, thermometer, compass, altimeter, and/or others) for collecting data from the user's environment. For example, one or more camera(s) may be used to provide feedback to the processor of the WHUD and influence where on the display(s) any given image should be displayed.

The WHUDs described herein may include one or more on-board power sources (e.g., one or more battery(ies)), a wireless transceiver for sending/receiving wireless communications, and/or a tethered connector port for coupling to a computer and/or charging the one or more on-board power source(s).

The WHUDs described herein may receive and respond to commands from the user in one or more of a variety of ways, including without limitation: voice commands through a microphone; touch commands through buttons, switches, or a touch sensitive surface; and/or gesture-based commands through gesture detection systems.

Throughout this specification and the appended claims the term "communicative" as in "communicative pathway," "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), and/or optical pathways (e.g., optical fiber), and exemplary communicative couplings include, but are not limited to, electrical couplings, magnetic couplings, and/or optical couplings.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An optical combiner comprising:

an incoupler optic to receive display light from outside of the optical combiner and redirect the display light to travel in a volume of the optical combiner;

a uniformization optic to receive one or more spatially separated portions of the display light propagating towards an outcoupler region comprising an outcoupler optic, and for each the received one or more spatially separated portions of display light, internally within the uniformization optic direct a sub-portion of that spatially separated portion of display light away from the outcoupler optic within the volume of the optical combiner, and subsequently internally within the uniformization optic redirect that same sub-portion of display light to travel again towards the outcoupler optic within the volume of the optical combiner before delivering the sub-portion as a portion of the display light to the outcoupler optic;

wherein the outcoupler optic is to receive the display light from the uniformization optic, redirect a first portion of the received display light to exit the volume of the optical combiner, and allow a second portion of the received display light to pass through the outcoupler region without being redirected to exit the volume of the optical combiner; and a first recycle optic to receive the second portion of the display light and redirect the second portion of the display light to travel in the volume of the optical combiner back towards the outcoupler region.

2. The optical combiner of claim 1, further comprising an expander region to receive display light from the incoupler optic, the expander region including an expander optic to redirect display light received from the incoupler optic towards the outcoupler region.

3. The optical combiner of claim 2, wherein the incoupler optic is to redirect a third portion of display light towards the expander region, and to redirect a fourth portion of display light away from the expander region, the optical combiner further comprising a second recycle optic to receive the fourth portion of display light, and to redirect the fourth portion of display light towards the expander region.

4. The optical combiner of claim 2, wherein the expander optic is to redirect a third portion of display light towards the outcoupler region, and to allow a fourth portion of display light to pass through the expander region without being redirected towards the outcoupler region, wherein the optical combiner further comprises:

a second recycle optic to receive the fourth portion of display light which passes through the expander region without being redirected towards the outcoupler region, and to redirect the fourth portion of display light towards the expander region, the expander optic to redirect the fourth portion of display light from the second recycle optic away from the outcoupler region; and a third recycle optic to receive the fourth portion of display light redirected away from the outcoupler region by the expander optic, and to redirect the fourth portion of display light towards the outcoupler region.

5. The optical combiner of claim 1, wherein the incoupler optic, the outcoupler optic, and the first recycle optic are surface relief gratings.

6. The optical combiner of claim 1, wherein the incoupler optic, the outcoupler optic, and the first recycle optic are holograms.

7. The optical combiner of claim 1, wherein the outcoupler optic is an optical grating, the first recycle optic is an optical grating, and the first recycle optic has a period which is half of a period of the outcoupler optic.

8. The optical combiner of claim 1, wherein the outcoupler optic is a two-dimensional optical grating to receive display light travelling in a first direction in the volume of the optical combiner, redirect some of the display light travelling in the first direction in the volume of the optical combiner to travel through the volume of the optical combiner in a second direction non-parallel to the first direction, and redirect some of the display light travelling in the second direction through the volume of the optical combiner to exit the volume of the optical combiner.

9. The optical combiner of claim 8, wherein at least some of the display light travelling in the first direction in the volume of the optical combiner is to pass through the outcoupler region without being redirected to travel in the second direction, at least some of the display light travelling in the second direction is to pass through the outcoupler region without being redirected to exit the volume of the optical combiner, the first recycle optic to receive the display light travelling in the second direction which passes through the outcoupler region and redirect the received display light towards the outcoupler region.

10. The optical combiner of claim 1, wherein the outcoupler optic and the first recycle optic are immediately adjacent to each other.

11. The optical combiner of claim 1, wherein the outcoupler optic and the first recycle optic are spatially separated from each other by a gap.

12. An optical combiner comprising:

an incoupler optic to receive display light from outside of the optical combiner and redirect the display light to travel in a volume of the optical combiner;

a uniformization optic to receive one or more spatially separated portions of the display light propagating towards an outcoupler optic, and for each the received one or more spatially separated portions of display light, internally within the uniformization optic direct a sub-portion of that spatially separated portion of display light away from the outcoupler optic within the volume of the optical combiner, and subsequently internally within the uniformization optic redirect that same sub-portion of display light to travel again towards the outcoupler optic within the volume of the optical combiner before delivering the sub-portion as a portion of the display light to the outcoupler optic;

an outcoupler optic to receive the display light from the uniformization optic and redirect the received display light to exit the volume of the optical combiner; and a recycle optic to receive display light travelling in the volume of the optical combiner in a direction away from the outcoupler optic, and redirect the display light travelling in the volume of the optical combiner in a direction away from the outcoupler optic towards the outcoupler optic.

13. The optical combiner of claim 12, wherein the outcoupler optic is positioned laterally between the incoupler optic and the recycle optic.

14. The optical combiner of claim 12, wherein the incoupler optic is positioned laterally between the recycle optic and the outcoupler optic.

15. The optical combiner of claim 12, further comprising an expander optic to receive display light from the incoupler optic, the expander optic to redirect the received display light towards the outcoupler optic.

16. The optical combiner of claim 15, wherein the expander optic is positioned laterally between the recycle optic and the outcoupler optic.

17. An optical combiner comprising:

an incoupler optic to receive display light from outside of the optical combiner and redirect the display light to travel in a first direction in a volume of the optical combiner;

an expander optic to receive display light travelling in the first direction in the volume of the optical combiner and redirect the display light to travel in a second direction in the volume of the optical combiner as a plurality of spatially separated portions of display light, the second direction non-parallel to the first direction;

a uniformization optic to receive at least one of the spatially separated portions of display light travelling in the second direction in the volume of the optical combiner, and for each of the received spatially separated portion of display light, to internally within the uniformization optic redirect a sub-portion of that spatially separated portion of display light to travel in the first direction within the volume of the optical combiner, and subsequently internally within the uniformization optic redirect that same sub-portion to travel again in the second direction within the volume of the optical combiner before delivering the sub-portion to an outcoupler optic; and the outcoupler optic to receive display light travelling in the second direction in the volume of the optical combiner and redirect the display light to exit the volume of the optical combiner.

18. The optical combiner of claim 17, wherein each of the incoupler optic, the expander optic, the uniformization optic, and the outcoupler optic comprise surface relief gratings.

19. The optical combiner of claim 17, wherein each of the incoupler optic, the expander optic, the uniformization optic, and the outcoupler optic comprise holograms.

20. The optical combiner of claim 17, wherein the uniformization optic comprises an optical grating, wherein for a region of the uniformization optic near to the incoupler optic, the uniformization optic has a first diffraction efficiency, for a region of the uniformization optic distal to the incoupler optic, the uniformization optic has a second diffraction efficiency, the first diffraction efficiency greater than the second diffraction efficiency.

21. The optical combiner of claim 17, wherein for a region of the uniformization optic near to the incoupler optic, the uniformization optic has a first width in the second direction, for a region of the uniformization optic distal to the incoupler optic, the uniformization optic has a second width in the second direction, the first width greater than the second width.

22. The optical combiner of claim 17, wherein the expander optic and the uniformization optic are immediately adjacent each other.

23. The optical combiner of claim 17, wherein the expander optic and the uniformization optic are a continuous grating area.

24. The optical combiner of claim 17, wherein the expander optic and the uniformization optic are spatially separated by a gap.

* * * * *